(12) United States Patent
Ohta et al.

(10) Patent No.: US 7,054,029 B1
(45) Date of Patent: May 30, 2006

(54) IMAGE PROCESSING APPARATUS AND METHOD, AND STORAGE MEDIUM

(75) Inventors: Ken-ichi Ohta, Kawasaki (JP); Shigeo Yamagata, Yokohama (JP); Takuto Harada, Yokohama (JP); Atsushi Matsumoto, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/521,850

(22) Filed: Mar. 9, 2000

(30) Foreign Application Priority Data

| Mar. 9, 1999 | (JP) | ................................. 11-062426 |
| Jul. 30, 1999 | (JP) | ................................. 11-217852 |
| Dec. 28, 1999 | (JP) | ................................. 11-373848 |

(51) Int. Cl.
*G06F 15/00* (2006.01)
*G06K 15/00* (2006.01)
*G06K 9/34* (2006.01)
*G06K 9/36* (2006.01)
*H04N 1/387* (2006.01)

(52) U.S. Cl. .................... 358/1.18; 358/2.1; 358/450; 358/1.12; 382/176; 382/177; 382/178; 382/291; 382/292; 382/284

(58) Field of Classification Search ................ 358/529, 358/534, 518, 536, 517, 801, 1.8, 1.9, 1.15, 358/2.1, 1.12, 1.18, 450; 345/596, 581, 606, 345/612; 382/176–178, 284, 291, 292; 709/202, 709/206, 209; 715/527

See application file for complete search history.

(56) References Cited

U.S. PATENT DOCUMENTS

| 4,843,405 | A | * | 6/1989 | Morikawa et al. | ........... 347/224 |
| 5,295,236 | A | * | 3/1994 | Bjorge et al. | ............... 715/527 |
| 5,436,981 | A | * | 7/1995 | Ishikawa | ..................... 382/173 |
| 5,483,361 | A | * | 1/1996 | Shimizu et al. | ............. 358/529 |
| 5,625,711 | A | * | 4/1997 | Nicholson et al. | ........... 382/224 |
| 5,659,407 | A | * | 8/1997 | Andresen et al. | ............ 358/530 |
| 5,748,789 | A | * | 5/1998 | Lee et al. | ..................... 382/243 |
| 6,257,693 | B1 | * | 7/2001 | Miller et al. | ................... 347/19 |
| 6,377,354 | B1 | * | 4/2002 | Nguyen et al. | ............. 358/1.11 |
| 6,490,055 | B1 | * | 12/2002 | Shimizu | ..................... 358/1.9 |
| 6,504,949 | B1 | * | 1/2003 | Matsukubo et al. | ........ 382/162 |

OTHER PUBLICATIONS

U.S. Appl. No. 09/434,404, filed Nov. 5, 1999.

* cited by examiner

*Primary Examiner*—Edward Coles
*Assistant Examiner*—Chan S. Park
(74) *Attorney, Agent, or Firm*—Fitzpatrick, Cella, Harper & Scinto

(57) ABSTRACT

Upon synthesizing objects, information bits indicating the types of objects are lost. To solve this problem, this invention provides an image processing apparatus having discrimination means for discriminating a type of object to be rendered, determination means for determining the presence/absence of synthesis of the discriminated object, synthesis means for synthesizing an object and information of the type of object in accordance with the determination result, and processing means for appending information indicating the type of synthesized object to a rendering result obtained by rendering the object to be rendered in units of pixels.

13 Claims, 27 Drawing Sheets

FIG. 4

| ATTRIBUTE MAP INFORMATION / PART ATTRIBUTE | VECTOR ATTRIBUTE | CHARACTER ATTRIBUTE | COLOR ATTRIBUTE |
|---|---|---|---|
| NATURE IMAGE (COLOR) | 0 | 0 | 0 |
| NATURE IMAGE (MONOCHROME) | 0 | 0 | 1 |
| CHARACTER (COLOR) | 1 | 1 | 0 |
| CHARACTER (MONOCHROME) | 1 | 1 | 1 |
| GRAPHIC (COLOR) | 1 | 0 | 0 |
| GRAPHIC (MONOCHROME) | 1 | 0 | 1 |

F I G. 5
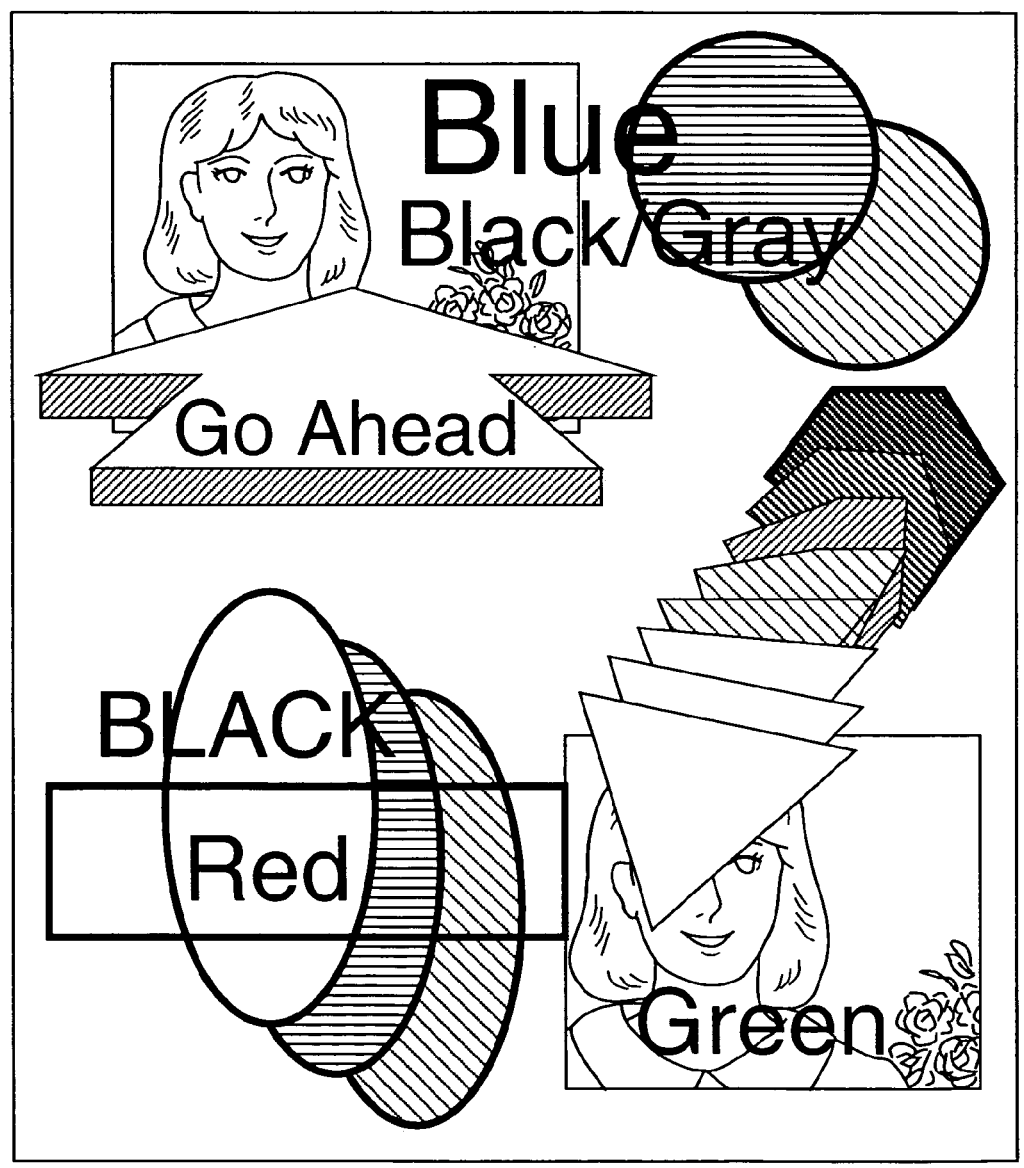

FIG. 6A
FIG. 6B
FIG. 6C
Blue
Red
Green
FIG. 6D
Black/Gray
Go Ahead
BLACK
FIG. 6E
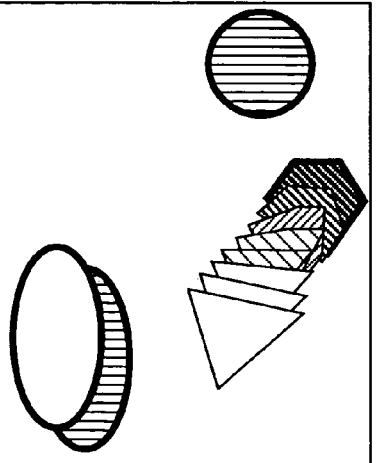
FIG. 6F
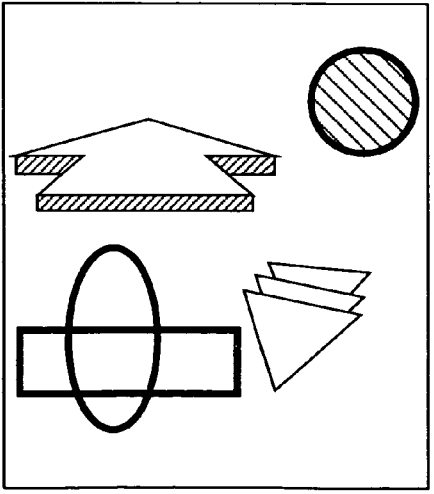

VECTOR ATTRIBUTE

CHARACTER ATTRIBUTE

COLOR ATTRIBUTE

FIG. 8A

| 25 | 50 | 125 |
|---|---|---|
| 100 | 75 | 150 |
| 225 | 200 | 175 |

FIG. 8B

| 210 | 220 | 230 | 240 | 250 |
|---|---|---|---|---|
| 200 | 70 | 80 | 90 | 100 |
| 190 | 60 | 10 | 20 | 110 |
| 180 | 50 | 40 | 30 | 120 |
| 170 | 160 | 150 | 140 | 130 |

FIG. 8C

| 172 | 176 | 180 | 184 | 188 | 192 | 196 | 200 |
|---|---|---|---|---|---|---|---|
| 168 | 84 | 88 | 92 | 96 | 100 | 104 | 204 |
| 164 | 80 | 28 | 32 | 36 | 40 | 108 | 208 |
| 160 | 76 | 24 | 4 | 8 | 44 | 112 | 212 |
| 156 | 72 | 20 | 16 | 12 | 48 | 116 | 216 |
| 152 | 68 | 64 | 60 | 56 | 52 | 120 | 220 |
| 148 | 144 | 140 | 136 | 132 | 128 | 124 | 224 |
| 254 | 252 | 248 | 244 | 240 | 236 | 232 | 228 |

FIG. 12

| 0 (BITMAP FLAG) | 1 (COLOR FLAG) | 2 (CHARACTER FLAG) | |
|---|---|---|---|
| 0 (BITMAP) | 0 (COLOR) | 0 (OTHER THAN CHARACTER) | } BITMAP FLAG = 0 |
| 1 (VECTOR) | 1 (MONOCHROME) | 1 (CHARACTER) | |
| | | 0 (TONE PRIORITY) | } BITMAP FLAG = 1 |
| | | 1 (RESOLUTION PRIORITY) | |

FIG. 15

| 0 (BITMAP FLAG) | 1 (COLOR FLAG) | 2 (CHARACTER FLAG) | |
|---|---|---|---|
| 0 (BITMAP) | 0 (COLOR) | 0 (OTHER THAN CHARACTER) | BITMAP FLAG = 0 |
| 1 (VECTOR) | 1 (MONOCHROME) | 1 (CHARACTER) | |
| | | 0 (TONE PRIORITY) | BITMAP FLAG = 1 |
| | | 1 (RESOLUTION PRIORITY) | |

FIG. 16

| SYNTHESIZED OBJECT | S NOT S | D NOT D | SorD SandD SxorD S α D |
|---|---|---|---|
| FLAG SYNTHESIS METHOD | S FLAG | D FLAG | AND |

FIG. 18

| SYNTHESIZED OBJECT | S NOT S | D NOT D | SorD SandD SxorD S α D |
|---|---|---|---|
| FLAG SYNTHESIS METHOD | S FLAG | D FLAG | ALL "0"S |

FIG. 20

| BIT | 0 | |
|---|---|---|
| INFORMATION | BITMAP FLAG | |
| | 0 | VECTOR |
| | 1 | BITMAP |

FIG. 21

| 0 | 0 | 0 | 0 | 0 | 0 | 0 | 0 | 0 |
|---|---|---|---|---|---|---|---|---|
| 0 | 0 | 0 | 0 | 1 | 1 | 0 | 0 | 0 |
| 0 | 0 | 0 | 1 | 1 | 1 | 0 | 0 | 0 |
| 0 | 0 | 1 | 1 | 1 | 1 | 0 | 0 | 0 |
| 0 | 0 | 0 | 0 | 1 | 1 | 0 | 0 | 0 |
| 0 | 0 | 0 | 0 | 1 | 1 | 0 | 0 | 0 |
| 0 | 0 | 0 | 0 | 1 | 1 | 0 | 0 | 0 |
| 0 | 0 | 0 | 0 | 1 | 1 | 0 | 0 | 0 |
| 0 | 0 | 0 | 0 | 1 | 1 | 0 | 0 | 0 |
| 0 | 0 | 0 | 0 | 1 | 1 | 0 | 0 | 0 |
| 0 | 0 | 0 | 0 | 1 | 1 | 0 | 0 | 0 |
| 0 | 0 | 0 | 0 | 1 | 1 | 0 | 0 | 0 |
| 0 | 0 | 0 | 1 | 1 | 1 | 1 | 0 | 0 |
| 0 | 0 | 0 | 0 | 0 | 0 | 0 | 0 | 0 |
| 0 | 0 | 0 | 0 | 0 | 0 | 0 | 0 | 0 |

| 25 | 50 | 125 |
|----|----|-----|
| 100 | 75 | 150 |
| 225 | 200 | 175 |

FIG. 30

| 254 | 148 | 152 | 156 | 160 | 164 | 168 | 172 |
|-----|-----|-----|-----|-----|-----|-----|-----|
| 252 | 144 | 68  | 72  | 76  | 80  | 84  | 176 |
| 248 | 140 | 64  | 20  | 24  | 28  | 88  | 180 |
| 244 | 136 | 60  | 16  | 4   | 32  | 92  | 184 |
| 240 | 132 | 56  | 12  | 8   | 36  | 96  | 188 |
| 236 | 128 | 52  | 48  | 44  | 40  | 100 | 192 |
| 232 | 124 | 120 | 116 | 112 | 108 | 104 | 196 |
| 228 | 224 | 220 | 216 | 212 | 208 | 204 | 200 |

IMAGE PROCESSING APPARATUS AND METHOD, AND STORAGE MEDIUM

FIELD OF THE INVENTION

The present invention relates to an image processing apparatus and method, and a storage medium.

BACKGROUND OF THE INVENTION

Conventionally, a system as shown in FIG. 1 is known as the above-mentioned system.

FIG. 1 schematically shows the arrangement of a system that creates a page layout document of DTP or the like, or a wordprocessing or graphic document using a host computer 101, and outputs such document as a hardcopy via a color laser beam printer, ink-jet printer, or the like.

Reference numeral 102 denotes an application which runs on the host computer. For example, document edit application software such as "WORD®" available from Microsoft Corporation, page layout software such as PageMaker® available from Adobe Systems Incorporated, and the like are representative ones.

A digital document created by such software is passed on to a printer driver 103 via an operating system (OS: not shown) of the computer.

The digital document is expressed as a set of command data that represent figures, characters, and the like which form one page, and these commands are sent to the printer driver 103. The printer driver 103 converts a series of commands as a language system called PDL (page description language). As typical PDLs, GDI®, PS® (PostScript), and the like are prevalent.

The printer driver 103 transfers generated PDL command data to a rasterizer 105 in a raster image processor 104. The rasterizer 105 renders characters, figures, and the like expressed by PDL commands into a two-dimensional bitmap image that the printer actually outputs. This device is called a "rasterizer" since a bitmap image fills a two-dimensional plane as repetitions of linear rasters (lines). The rendered bitmap image is temporarily stored in an image memory 106.

FIG. 2A depicts the aforementioned operations. A document image 111 displayed on the host computer is sent as a PDL command sequence 112 to the rasterizer via the printer driver, and the rasterizer renders a two-dimensional bitmap image 113 on the image memory.

The rendered image data is sent to a color printer 107. The color printer 107 uses a known electrophotographic or ink-jet recording image forming unit 108, and prints out an image by forming a visible image on a paper sheet using such unit. The image data in the image memory is transferred in synchronism with a sync signal and clock signal (not shown) required for operating the image forming unit, a transfer request of a specific color component signal, or the like.

In the aforementioned prior art, upon examining an image forming unit used in output, various problems are posed.

For example, in order to form a color image on a printout medium, a color printer normally forms an image using four colors, i.e., cyan (C), magenta (M), yellow (Y), and black (K) toners or inks on the basis of so-called subtractive color mixing.

On the other hand, upon displaying an image, the application on the host computer normally uses a color monitor, which displays colors using additive primaries, i.e., red (R), green (G), and blue (B).

Hence, all of colors of characters, figures and figures that form a document, and colors of images laid out by scanning photos and the like via a scanner are expressed as those obtained by mixing R, G, and B.

That is, the rasterizer must convert color information which is defined by R, G, and B as PDL and transferred from the host computer into C, M, Y, and K by some means, and must then generate a bitmap image and output it to the printer.

However, a method of converting R, G, and B into C, M, Y, and K is not uniquely determined, and an optimal conversion method differs depending on the attributes of figures defined by PDL. For example, referring to FIG. 2A, reference numeral 114 denotes a natural image scanned by, e.g., a scanner; 115, graphic images such as a rectangle and the like, which are electronically generated; and 116, character (TEXT) images. That is, these images have different attributes.

When the color of each TEXT image 116 is defined as black (R=G=B=0), optimal C, M, Y, and K signals corresponding to this color are expressed by 8-bit density signals C=M=Y=0 and K=255. That is, a black character is preferably reproduced using only black toner of the four color toners of the printer.

On the other hand, when a specific pixel value of the natural image 114 is R=G=B=0, if that value is converted into C=M=Y=0 and K=255 in the same manner as the character data, the highest density portion in the natural image is reproduced using only black toner, and the absolute density becomes insufficient. In this case, a better result is obtained when this pixel value is converted into a value given by C=M=Y=100 and K=255 to increase the absolute density.

In order to solve such problem, the following method may be used. That is, the rasterizer renders input R, G, and B values into a bitmap image without converting them into C, M, Y, and K, and the image forming unit detects a character image area from the received RGB bitmap image using known image area separation, and uses different RGB to CMYK conversion methods for the detected character image area and other areas to generate and output CMYK data.

However, the image area separation cannot always perfectly detect a character area, and often detects some natural image area as a character area. Hence, an image is formed based on wrong detection results, thus disturbing improvement of the quality of an image to be recorded.

As another example, the image forming unit can express only binary dots. In such case, the rasterizer renders Y, M, C, and K multi-valued bitmap image data on the image memory, and the image forming unit that receives the bitmap data converts the multi-valued image signal into a binary image signal by a known binarization process such as error diffusion, dithering, or the like, and prints it out.

At this time, an optimal binarization method also differs depending on image attributes. That is, graphic data such as characters, figures, and the like preferably undergo binarization that uses a small matrix size of dithering and attaches importance on resolution. On the other hand, a natural image such as a photo or the like preferably undergoes binarization that uses a large matrix size, and attaches importance on tone reproduction.

In this case as well, the multi-valued bitmap image data transferred from the image memory may undergo image area separation to adaptively switch the dither matrix size. However, the same problem as in the above case cannot be prevented.

To avoid such problem, the present applicant has proposed the following method (U.S. patent application Ser. No. 09/434,404). That is, upon rendering a PDL image into a bitmap, attribute information indicating whether the rendered image data corresponds to a natural image area or character/figure area is generated at the same time, and is rendered into a two-dimensional bitmap like the bitmap image. Upon transferring the rendered image data to the image forming unit, the attribute information is transferred at the same time, and different image processes are done on the basis of the attribute information to output a hard copy.

In this case, different dither matrices or different color processes can be applied in correspondence with the aforementioned image attributes. However, when partial images having different attributes are rendered on an identical coordinate position (for example, characters are overwritten on a natural image, or a photo is pasted on a graphic figure), attribute setups of those portions may suffer certain conflicts.

Such conflicts take place when an achromatic gray graphic figure is overwritten on a color natural image and the natural image as the background is set to be seen through the interior of the figure. At this time, since the figure to be overwritten is achromatic, it should be an area to be reproduced using black alone and, for this reason, attribute information indicating a monochrome object is appended to that graphic area. However, since that figure is overwritten so that the background color image can be seen through, if it is reproduced using black alone, color information of the natural image to be seen through in the background is lost.

The two-dimensional map of the attribute information described above also suffers the following problem.

When the object to be processed is only a natural image such as the image 114 shown in FIG. 2A, such method suffices for use. However, when a character (TEXT) image is included in the natural image like an image 7b shown in FIG. 2B, since an attribute "natural image" is determined, a process that is not suitable for the property of the character (TEXT) image is highly likely to be done.

In order to solve such problem, the rasterizer 105 renders R, G, and B signal values into a bitmap image without converting them into C, M, Y, and K signals, and the image forming unit 108 detects a character image area from the received RGB bitmap image using known image area separation, and uses different RGB to CMYK conversion methods for the detected character image area and other areas to generate and output CMYK data.

However, when the entire image undergoes the image area separation, it is time-consuming, and even a pixel of a character may be erroneously determined not to be a character depending on the precision of image area separation.

Especially, when a CPU processes an image area separation program without any hardware, software processes require a longer time.

SUMMARY OF THE INVENTION

It is an object of the present invention to provide an image processing apparatus and method, and a storage medium, which can solve the aforementioned problems.

According to a preferred embodiment of the present invention, there is provided an image processing apparatus comprising: attribute information generation means for generating attribute information indicating an attribute of an image in correspondence with a command that represents the image; bitmap data generation means for generating bitmap image data by rendering the command; and image processing means for performing an image process of the bitmap image data in accordance with the attribute information, wherein attribute information at an overlapping position of first and second images in accordance with the command is determined in accordance with attribute information of the first image and attribute information of the second image.

It is another object of the present invention to provide an image processing apparatus and method, and a storage medium, which have novel functions.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a table showing the relationship between the image attributes and attribute map;

FIG. 5 shows an example of a PDL document to which the embodiment shown in FIG. 3 is applied;

FIGS. 6A to 6F show parts shown in FIG. 5 in units of attributes;

FIGS. 8A to 8C show examples of dither matrices;

FIG. 12 shows object information 305;

FIG. 15 shows an object 605;

FIG. 16 is a view showing a synthesizing method;

FIG. 18 is a view showing the processing of the fourth embodiment;

FIG. 20 shows an example of the format of an attribute map of the fifth embodiment;

FIG. 21 shows an example of an attribute map stored in correspondence with image data in units of pixels;

FIG. 30 shows an example of a dither matrix of the fifth embodiment;

DETAILED DESCRIPTION OF THE PREFERRED EMBODIMENTS

First Embodiment

The preferred embodiments of the present invention will be described in detail hereinafter with reference to the accompanying drawings.

Figure 1:
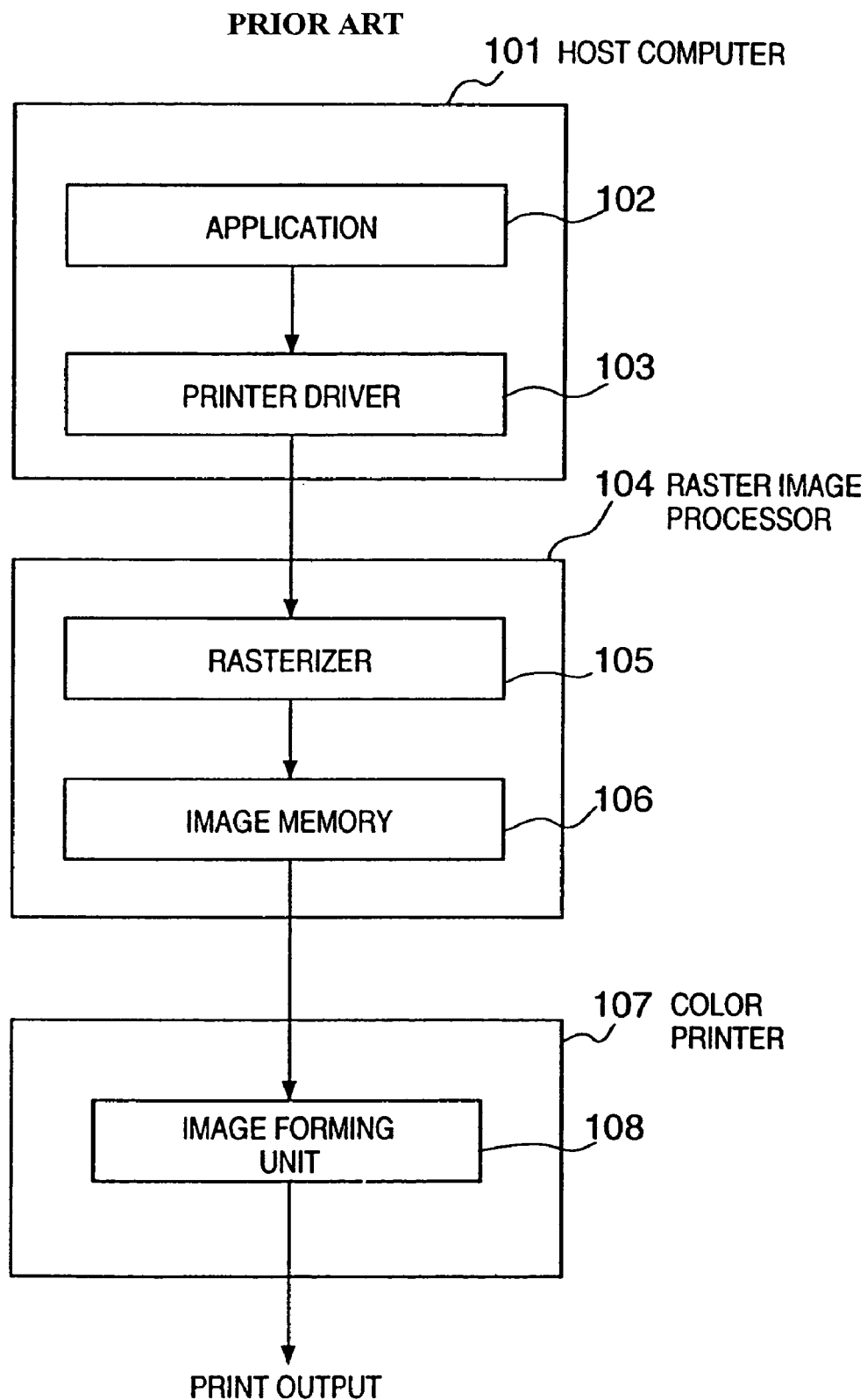
FIG. 1 is a block diagram showing an example of the arrangement of a conventional system.
Figure 3:
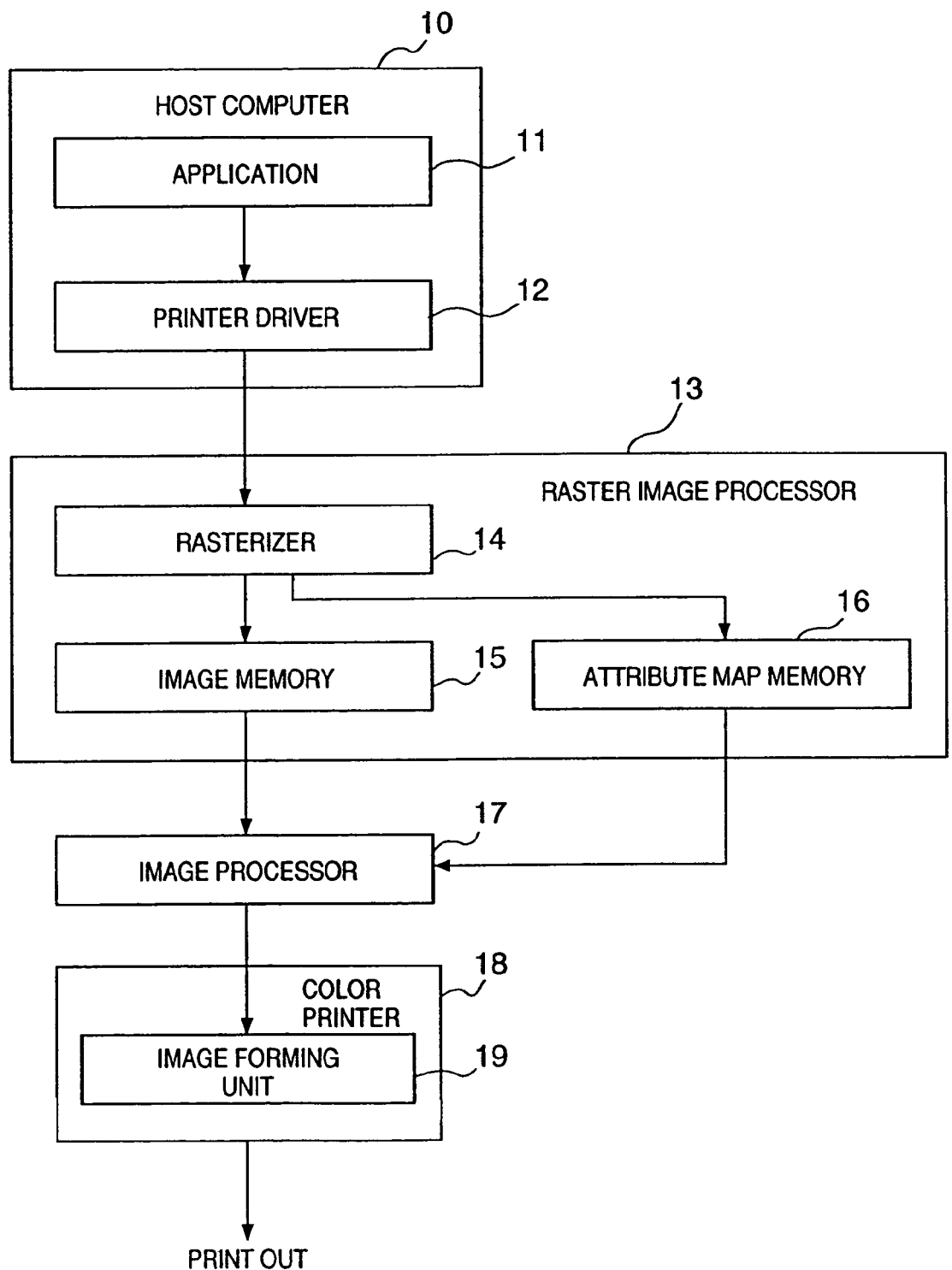
FIG. 3 is a block diagram for explaining the arrangement according to an embodiment of the present invention.

FIG. 3 is a system block diagram showing the arrangement according to an embodiment of the present invention. Referring to FIG. 3, reference numerals 10 to 15 denote the same components as the components 101 to 106 shown in FIG. 1. Also, reference numerals 18 and 19 denote the same components 107 and 108 in FIG. 1.

A characteristic feature of this embodiment lies in an attribute map memory 16 and image processing unit 17. Note that the image processing unit 17 is depicted as a standalone unit, but may be included in a raster image processor 13 or color printer 18. Also, a rasterizer 14 may be a standalone device or may be included in a host computer 10 or the color printer 18.

The rasterizer 14 generates a bitmap image on an image memory 15 on the basis of commands corresponding to individual image parts (to be referred to as objects hereinafter) that form an image. At this time, the rasterizer 14 generates attribute map information on the basis of the attributes of the image parts and the generated information in an attribute map memory 16.

Assume that the rasterizer 14 in this embodiment generates R, G, and B 8-bit bitmap images per pixel upon generating a bitmap image on the image memory 15 (hence, the image memory 15 is initialized by data FFh representing "white" every time image recording for one page is completed).

FIG. 4 shows an example of the relationship between the part attributes and attribute map information in this embodiment.

Note that each attribute map information is 3-bit flag information, and is generated in accordance with six different part attributes, as shown in FIG. 4. The attribute map information includes three attributes, i.e., vector attribute, character attribute, and color attribute. The vector attribute assumes "0" when a given part (object) is a natural image, or "1" when it is a graphic object such as a character, figure, or the like. The character attribute assumes "0" when a given object is a natural image or graphic object, or "1" when it is a character object. The color attribute is determined based on whether an object is color (chromatic) or monochrome (achromatic), and is set at "0" when a given object is a color object irrespective of a natural image, character, or graphic object, or "1" in case of a monochrome object. Note that these objects are definitions for one object. For example, a color attribute="0" indicates that the entire object is chromatic, but does not indicate that the pixel of interest is chromatic.

Referring back to FIG. 3, the image processing unit 17 executes various image processes for bitmap data in the image memory 15, and outputs the processed data to the color printer. At this time, the unit 17 switches the image processing method as needed with reference to the attribute map information stored in the attribute map memory 16 in accordance with the rules shown in FIG. 4 (to be described in detail later).

Note that an image forming unit 19 in this embodiment uses a color laser beam printer engine (but the present invention is not limited to such specific engine, and an ink-jet printer may be used). The operation of the unit 19 will be briefly explained below. A recording paper sheet is wound around a transfer drum (not shown), and a toner image for one color component formed on a photosensitive drum (not shown) is transferred to the recording paper sheet. This process is repeated for a total of four color components in turn. Upon completion of transfer of the last color component (Bk component), the transferred toner images are fixed by a fixing device, and the recording paper sheet is exhausted outside the unit.

A method of generating the attribute map information will be described in more detail below.

Before the beginning of rendering of PDL data, the contents of the attribute map memory 16 are initialized so that all the attributes are "1". This is to process attribute information without any conflicts upon rendering a plurality of objects overwritten on each other, as will be described later.

A document image described in PDL is then rendered. Assume that the document is as shown in FIG. 5. This document is composed of a plurality of objects having different attributes, and FIGS. 6A to 6F respectively depict the document decomposed in units of attributes.

FIG. 6A depicts a color natural image object, and FIG. 6B depicts only a monochrome natural image object. Likewise, FIG. 6C depicts a color character object, FIG. 6D a monochrome character object, FIG. 6E a color graphic object, and FIG. 6F a monochrome graphic object. When all these objects are superposed on each other, the document shown in FIG. 5 is obtained.

Areas occupied by these objects shown in FIGS. 6A to 6F respectively correspond to individual attributes in the left column in FIG. 4, and attribute map information is generated at the coordinate position of each object in accordance with the rules shown in FIG. 4, and is written in the attribute map memory 16.

For example, values, i.e., vector attribute=0, character attribute=0, and color attribute=0 are written as attribute map information in a rectangular area on the attribute map memory 16 where the image shown in FIG. 6A is present.

Also, in the monochrome natural image area shown in FIG. 6B, color attribute=1 is generated in a rectangular area where the image is present (other attributes, i.e., vector and character attributes are "0").

Likewise, vector attribute=1, character attribute=1, and color attribute=0 are generated in the attribute map memory corresponding to the area where the image shown in FIG. 6C is rendered, and vector attribute=1, character attribute=1, and color attribute=1 are generated in FIG. 6D.

Furthermore, vector attribute=1, character attribute=0, and color attribute=0 are generated in FIG. 6E, and vector attribute=1, character attribute=0, and color attribute=1 are generated in FIG. 6F.

As can be seen from FIGS. 6A to 6F, objects having different attributes are rendered at an identical position on the bitmap memory to overlap each other. For example, a lower right triangle object in FIG. 6F is overwritten on a lower right natural image portion in FIG. 6B.

In such case, since the last rendered object is overwritten on the bitmap image, the attribute information of the last rendered object is overwritten on the attribute map information. That is, in case of FIG. 5, the attribute information of the triangle graphic object is finally saved in the attribute map memory.

However, when different objects are to be rendered at an identical coordinate position to overlap each other, and the already rendered image data is to remain visible, a graphic object is often overwritten on, e.g., an area where a natural image is already present while being ANDed or ORed with that image. Such process corresponds to ROP (Raster Operation Process) in case of the aforementioned GDI®.

In this case, if the attribute information of an object to be overwritten is also overwritten, for example, if a monochrome character is overwritten on a color natural image, the color attribute of the overwritten portion becomes "1" (i.e., monochrome), and the already saved color image information is lost.

To avoid such problem, this embodiment generates attribute map information as follows.

When a new object is rendered, the attribute map memory corresponding to the bitmap coordinate position where the object is to be rendered is referred to, so as to check the already generated attribute information. The attribute information, rendering of which is in progress is compared with the already generated attribute information on the attribute map memory in units of bits. If attributes of the two object match, the corresponding attribute is saved; if they do not match, that bit is reset to "0". Since the attribute map information is initialized to all "1"s in the initial state, when a new object is rendered on an area (background area) where no object is rendered yet, if a given bit of attribute information of the object to be rendered is "1", the attribute information of that bit becomes "1"; otherwise, it is reset to "0".

Note that attribute information is compared in units of bits. Alternatively, whether or not all three pieces of attribute information match may be checked, and if they match, the attributes may be saved; otherwise, the attributes may be reset to "0".

In the former case, assuming that the already rendered image is a monochrome graphic object, and an object to be rendered while being overwritten on that image is a color character object, since their vector attributes are "1", the attribute to be saved remains "1". However, since the character attribute of the former object is "0" and that of the latter object is "1", the attribute is reset to "0". Also, since the color attribute of the former object is "1", and that of the latter object is "0", that attribute is also reset to "0".

Hence, the attribute information generated at that pixel position in this case includes vector attribute=1, and character attribute=color attribute=0, and the objects at that pixel position are handled as a color graphic object.

Figure 7A:
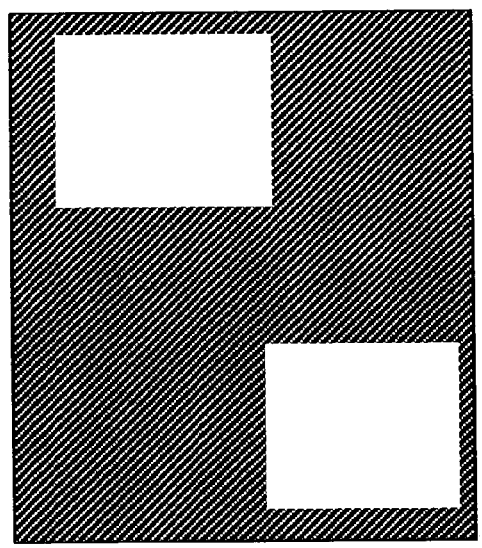
FIGS. 7A to 7C are views for explaining attribute map information generated for the document shown in FIG. 5.
Figure 7B:
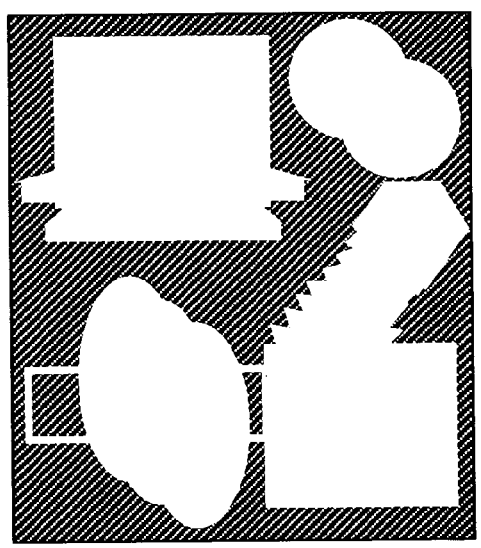
Figure 7C:
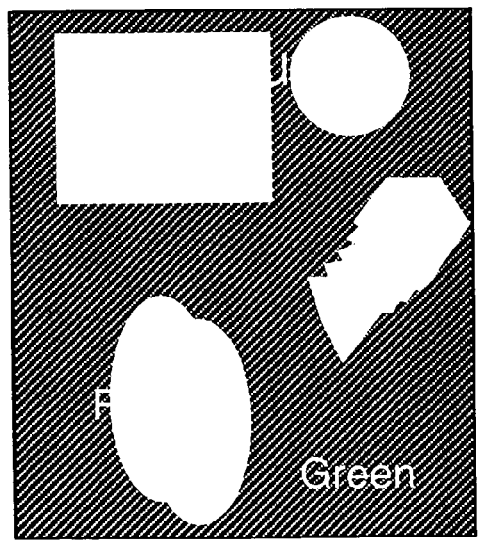

Three pieces of attribute information shown in FIGS. 7A to 7C are generated in the aforementioned procedures, and FIGS. 7A, 7B, and 7C respectively show the vector, character, and color attributes. In these figures, an area painted in black indicates a portion where the corresponding attribute="1".

Since the initial state corresponds to all "1"s, in case of the vector attribute shown in FIG. 7A, only areas where objects with vector attribute=0, i.e., natural images are rendered, are set with "0", and the remaining portion is set with "1".

Likewise, in the character attribute shown in FIG. 7B, "0" is set in areas where non-character objects are rendered.

Furthermore, in FIG. 7C, when a color object is rendered, attribute information in that area is reset to "0".

In this manner, the attribute map information is generated.

The bitmap image data rendered on the image memory 15 and the attribute map data stored in the attribute map memory 16 are transferred to the image processing unit 17 together with sync signals (not shown).

At this time, data at a predetermined pixel position of the image memory 15, and attribute map data of a corresponding pixel must be transferred in correspondence with each other. That is, when the pixel value of a specific pixel in the image memory is transferred to the image processing unit, attribute map data (flag data) of that pixel must also be transferred at substantially the same time.

The image processing unit 17 performs various image processes for pixel values (data in units of color components) from the image memory 15. In this case, the processing method is determined and controlled on the basis of attribute information (flag data) from the attribute map memory 16.

More specifically, data for a given color component, which is being formed by the image forming unit at that time, is extracted from image data (24-bit RGB data) rendered on the image memory 15 by a log conversion process and UCR process. Since a method of converting RGB luminance data into YMCK density data is known to those who are skilled in the art, a detailed description thereof will be omitted. In this case, the extracted data for one recording color component undergoes a dither matrix size switching process in accordance with the attribute map information, and is converted into a binary signal. That binary signal is output to the image forming unit 19.

FIGS. 8A to 8C show examples of dither matrices to be switched. The three different matrices shown in FIGS. 8A to 8C are switched depending on the attribute map information. Image data used in this embodiment assumes an 8-bit integer value (0 to 255) in units of pixels, and is binarized using a value in each cell of the dither matrix as a threshold value, thus controlling the ON/OFF state of each output pixel. FIG. 8A shows a dither matrix having a 3×3 size, which can express 10 gray levels at a resolution of 200 dpi if one pixel=600 dpi. FIG. 8B shows a dither matrix having a 5×5 size, which can express 120 dpi/26 gray levels. FIG. 8C shows a dither matrix having an 8×8 size, which can express 75 dpi/65 gray levels.

Therefore, the attribute map information corresponding to the pixel of interest is referred to, and if that pixel belongs to a continuous tone area, i.e., it has vector attribute="0", the corresponding image data is binarized using the matrix shown in FIG. 8C. On the other hand, if the pixel of interest belongs to a graphic area, i.e., it has vector attribute="1" and character attribute="0", the corresponding image data is binarized using the matrix shown in FIG. 8B. Furthermore, when the pixel of interest belongs to a character area, i.e., it has vector attribute="1" and character attribute "1", the matrix shown in FIG. 8A is used. In this manner, for example, a photo or the like is reproduced using a matrix having a larger size while attaching importance on tone reproduction characteristics, a character is reproduced at a higher resolution using a matrix having a smaller size, and a graphic is reproduced using an intermediate matrix size therebetween, thus obtaining a high-quality output image.

As described above, according to this embodiment, objects which are described in PDL and are to be recorded are rendered into a bitmap image for one page, and attribute information of each object is generated in correspondence with the bitmap image in accordance with the attribute (a character, line image, or halftone image such as a photo image) of that object in units of pixels. Even when different attributes are present at an identical position, they are corrected to an attribute suitable for the different overlapping attributes as needed, thus recording an image with higher quality.

Second Embodiment

In the above embodiment (first embodiment), attribute map data is read out from the attribute map memory 16 in synchronism with pixel data (RGB data) from the image memory 15, and the image processing unit 17 switches the dither matrix size in accordance with the readout attribute map data.

However, a UCR process used upon converting RGB→YMCK may be controlled in accordance with the attribute map data.

For example, if all the vector, character, and color attributes in the attribute map data are "0", i.e., that pixel belongs to a color photo image or the like, an 80% UCR process is done in place of a 100% UCR process to decrease the Bk amount, thus making correction that allows recording using all the recording color components.

When the pixel of interest has no color attribute, image recording is controlled to be done using only a Bk component. For example, even when the pixel of interest belongs to, e.g., a photo image, if that image area does not have any color attribute, only a Bk component is output, and "0" is forcibly output as other components (C, M, and Y).

When the pixel of interest belongs to a character or vector image and has a color attribute in accordance with the attribute map data, the corresponding image data undergoes a 100% UCR process.

As described above, according to the second embodiment, the same effect as in the first embodiment can be provided.

Note that the first and second embodiments may be combined as needed (both the binarization control and UCR control may be done according to the attribute map).

Third Embodiment

In the first and second embodiments, three different attributes respectively indicating whether the pixel of interest is a vector image or not, a character or not, and color or monochrome have been explained. Of course, the present invention is not limited to these specific attributes. For example, various other kinds of flag information, e.g., a flag that identifies the hue or saturation of a given color of a color object, a flag indicating if the pixel of interest belongs to an edge portion of a given object, and the like may be used.

Also, the image processing methods to be switched based on the attribute map information are not limited to those in the above embodiments. For example, various other image processes such as an edge emphasis process (edge emphasis filter), a compression method upon compressing bitmap data and transferring it to the printer, and the like may be switched.

As a rule for generating new attribute information on the basis of attribute information of two objects, when the attribute information values of the two object are equal to each other, that value is used in this embodiment; otherwise, the attribute is reset to zero. This process is equivalent to ANDing of two attribute information values. However, the present invention is not limited to such process, for example, two attributes may be ORed to preferably set an attribute="1", attribute information of the overwritten object may always be used, or attribute information of the already saved object may be preserved.

Furthermore, in the above embodiments, bitmap image data of R, G, and B luminance components are rendered on the image memory 15. Alternatively, bitmap image data of Y, M, and C or Y, M, C, and K density components may be rendered.

In the above embodiments, the color LBP has been exemplified as the image forming unit. Alternatively, the present invention may be applied to an image forming unit which uses PWM and is capable of multi-valued image recording. In this case, since the need for conversion into one pixel into one bit (binarization process) can be obviated, the attribute map information can be applied to an RGB→YMCK conversion process, an edge emphasis process of density converted image data, or the like.

The recording scheme is not limited to that of the laser beam printer. For example, an engine that ejects ink droplets, or any other engines may be used. That is, an optimal recording process can be selected as needed in accordance with the attribute information stored in the attribute map memory 16.

Furthermore, in the above embodiments, the raster image processor 13 is interposed between the host computer 10 and color printer 18. Alternatively, the raster image processor 13 may be incorporated in the housing of the color printer, or may be implemented as one of processes of the host computer 10.

In the latter case, the raster image processor can be built in especially as one of functions of the printer driver 12. Hence, the present invention can also be achieved by supplying, to a system or apparatus, a storage medium that stores program codes of software, which implements the functions of the above embodiments, and reading out and executing the program codes stored in the storage medium by a computer (or a CPU or MPU) of the system or apparatus.

As described above, according to the first to third embodiments, a mixed image which is expressed by print information described in the command format and has different attributes can be printed out with higher image quality.

Fourth Embodiment

The fourth embodiment will be described below.

Figure 9:
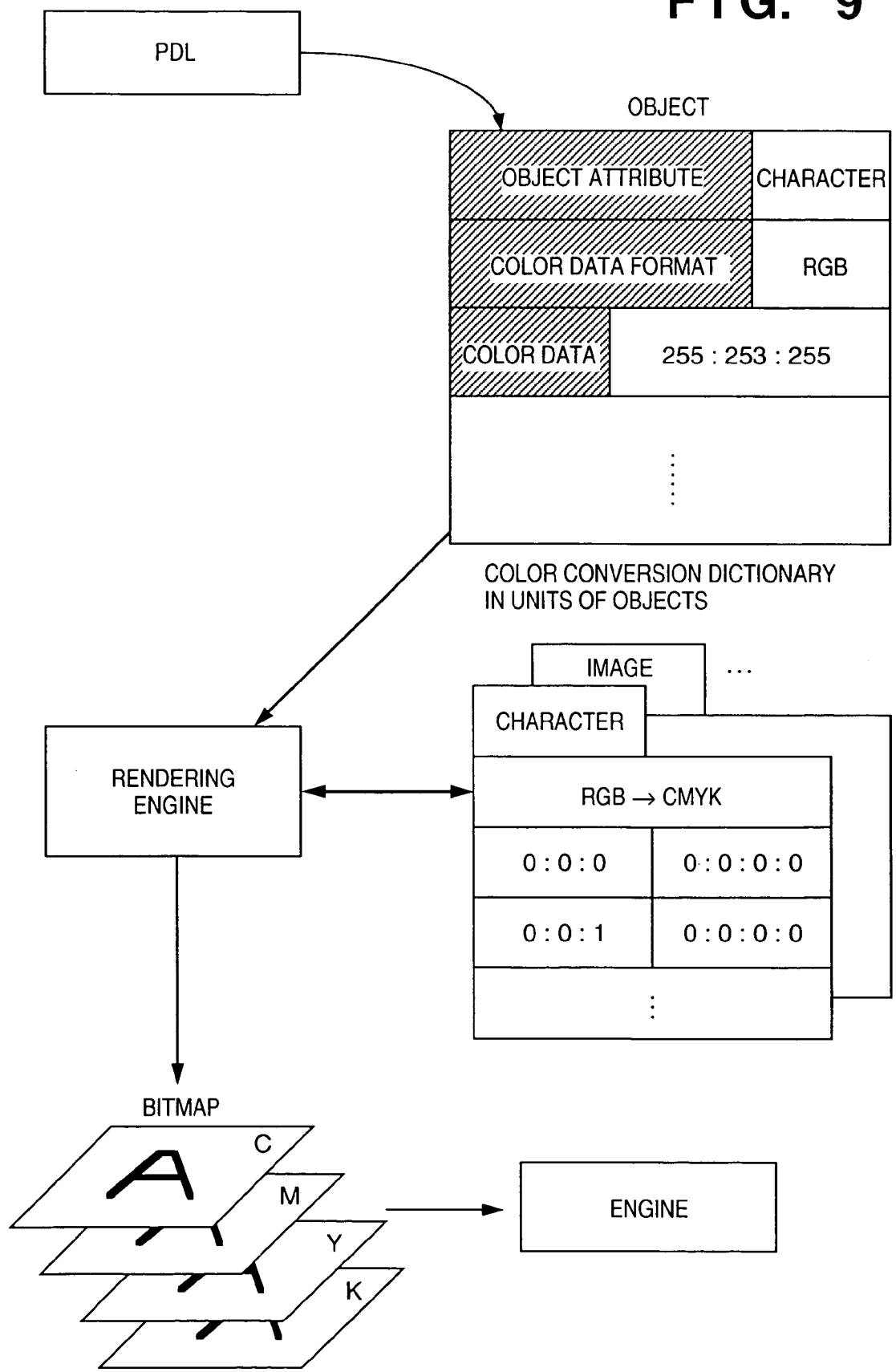
FIG. 9 is a block diagram of a rendering process.

As has been early in the paragraphs of the prior art, after image data is rendered into a bitmap image, as shown in FIG. 9, objects from which the bitmap is created cannot be determined, and source object information cannot be accurately recognized after rendering, thus disturbing a post-process such as accurate edge extraction.

A rendering engine premised on rendering models on the basis of a Painater, S algorithm like PostScript® is described, but information bits that indicate the types of objects upon synthesizing objects (ROP or object synthesis with transparency) are lost.

The embodiment that can solve the above problems will be explained below.

Figure 10:
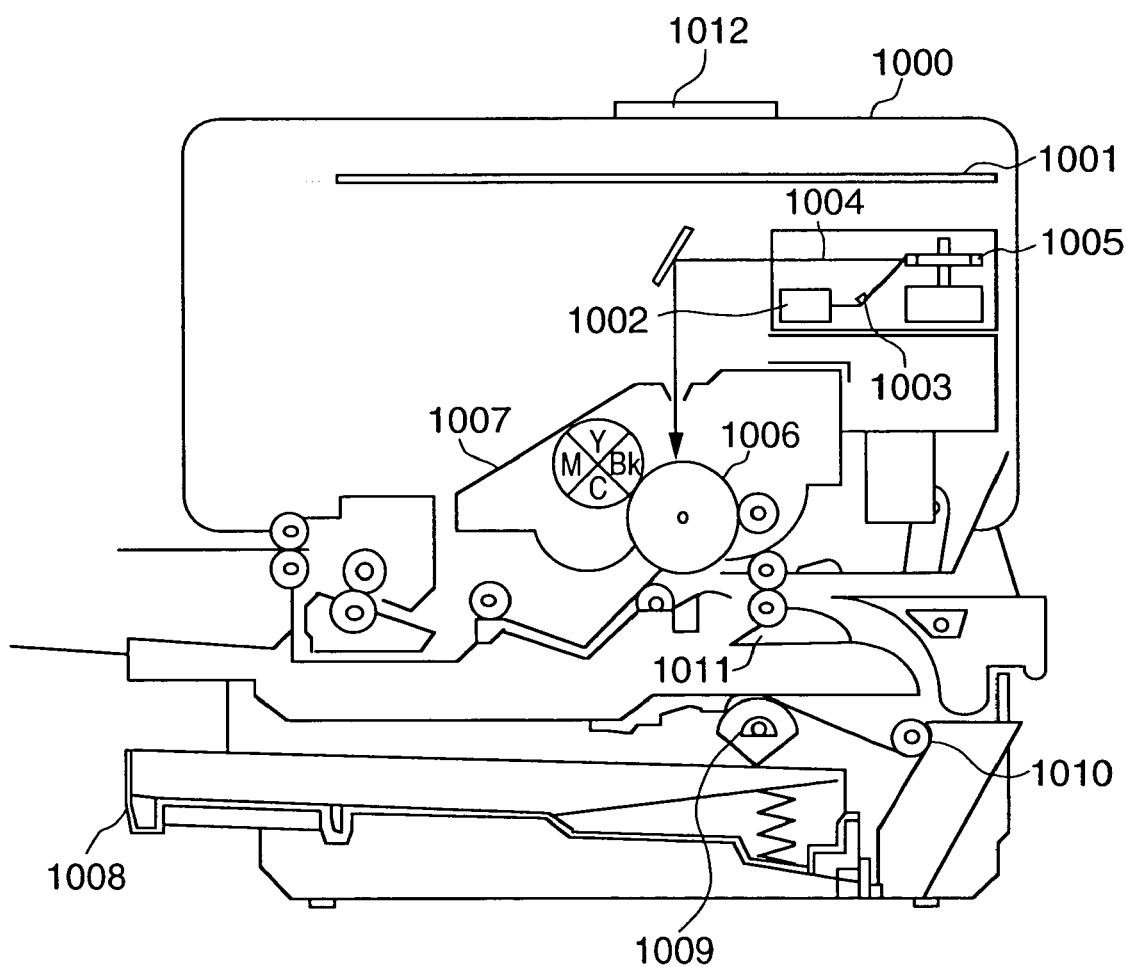
FIG. 10 is a sectional view of an LBP.

FIG. 10 is a sectional view showing the internal structure of a laser beam printer (to be abbreviated as an LBP hereinafter) used in this embodiment. In this LBP, character patterns, standard formats (form data), and the like can be registered from a data source such as a host computer or the like (not shown).

Referring to FIG. 10, reference numeral 1000 denotes an LBP main body, which receives and stores character information (character code), form information, macro commands, and the like supplied to an externally connected host computer, generates a corresponding character pattern, form pattern, and the like in accordance with such information, and forms an image on a recording paper sheet as a recording medium. Reference numeral 1012 denotes a control panel on which switches, LED indicators, and the like for operations are arranged; and 1001, a printer control unit for controlling the overall LBP 1000 and interpreting character information or the like supplied from the host computer. The control unit 1001 mainly converts character information into a video signal of a corresponding character pattern, and outputs it to a laser driver 1002. The laser driver 1002 is a circuit for driving a semiconductor laser 1003, and controls to turn on/off a laser beam 1004 emitted by the semiconductor laser 1003 in accordance with the input video signal. The laser beam 1004 is deflected in the right-and-left direction by a rotary polygonal mirror 1005 to scan the surface of an electrostatic drum 1006. On the surface of the electrostatic drum 1006, an electrostatic latent image of the character pattern is formed. This latent image is formed in units of yellow, magenta, cyan, and black colors, is developed by each of yellow, magenta, cyan, and black developing units 1007, and is then transferred onto a recording paper sheet. The recording paper sheet uses a cut sheet, which is housed in a paper cassette 1008 loaded into the LBP 1000. The recording paper sheet is fed into the apparatus by a paper feed roller 1009 and convey rollers 1010 and 1011, and is supplied to the electrostatic drum 1006.

Figure 13:
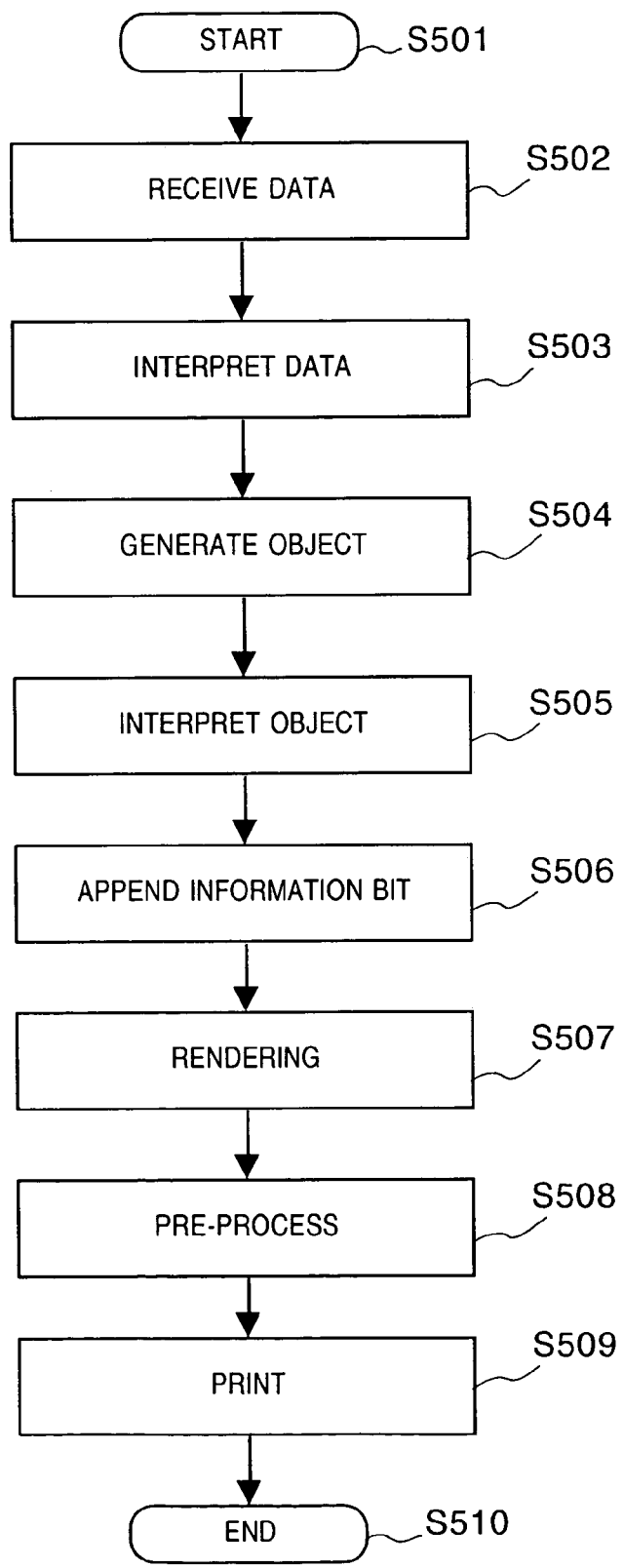
FIG. 13 is a flow chart showing the processing sequence of the fourth embodiment.

In the printer system with the above arrangement, this embodiment will be described below along the flow chart shown in FIG. 13 with reference to FIGS. 11 and 12.

Figure 11:
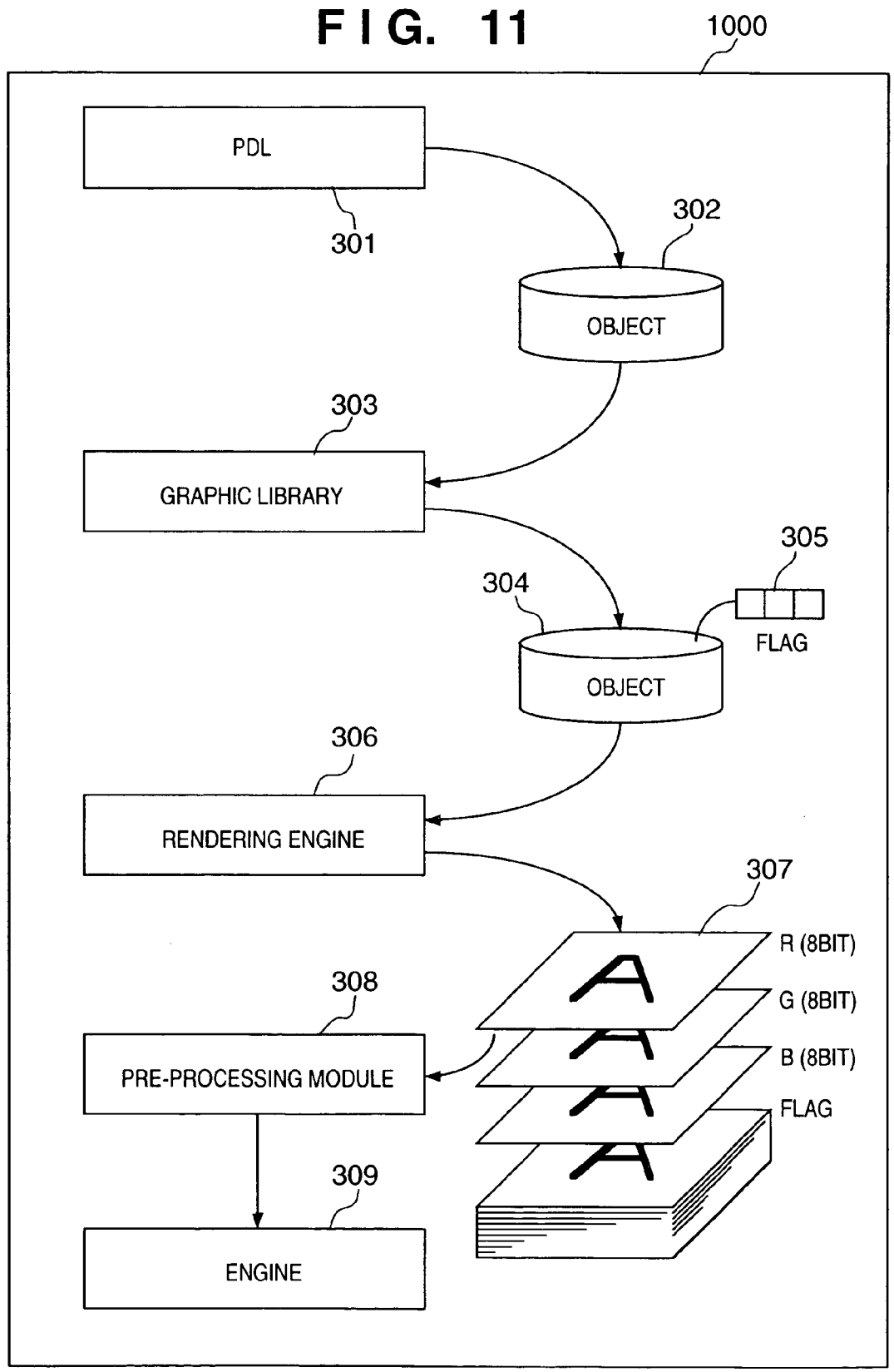
FIG. 11 is a block diagram showing the arrangement of the fourth embodiment.

Referring to FIG. 11, reference numeral 301 denotes a PDL interpreter for interpreting PDL (page description language: for example, PostScript®, GDI®, and the like) data. Reference numeral 302 denotes an object created by the PDL interpreter 301. Reference numeral 303 denotes a graphic library which converts the object 302 into a command 304 that a rendering engine can interpret, and appending object information (Flag) 305 to the command 304 (refer to FIG. 12 (to be described later) for details of object information). Reference numeral 306 denotes a rendering engine. Reference numeral 307 denotes a bitmap image of (8 bits for each of R, G, and B+object information bits (3 bits))/pixel. Reference numeral 308 denotes a pre-processing module for performing an image process before printing the bitmap image 307 by a printer engine 309.

FIG. 12 shows details of the object information 305. The object information uses 3 bits: bit 0 indicates if the pixel of interest belongs to a bitmap object or vector graphic (to be referred to as a bitmap flag hereinafter), and bit 1 indicates if the pixel of interest belongs to a color object (to be referred to a color flag hereinafter). Bit 2 indicates if the pixel of interest belongs to an object other than a character or a character when the bitmap flag is "0" (=bitmap data), and indicates if a tone or resolution priority mode is selected when the bitmap flag is "1" (=vector data) (to be referred to as a character flag hereinafter).

The processing sequence in the processing blocks shown in FIG. 11 will be described below using FIG. 13.

Upon receiving print data by the LBP 1000 (step 502), the PDL interpreter 301 interprets the received data (step 503). The PDL interpreter 301 outputs the interpretation result, i.e., the object 302 as one rendering command of one object in most cases (step 504). The graphic library 303 interprets the object 302 (step 505), and generates the command 304 appended with the object information flags 305 on the basis of the interpretation result (step 506).

The rendering engine 306 renders the command 304 and object information flags 305 to generate the bitmap image 307 (step 507). At this time, data to be rendered is the command 304 alone, and the object information flags 305 are output through the engine 306, and are appended to each pixel of the rendering result. The pre-processing module 308 performs a pre-process for printing the bitmap image 307 by the engine 309 (step 508). More specifically, the module 308 executes RGB 24 bits→CMYK 1 bit conversion (color conversion, binarization), a black character process (process for rendering a character using black alone when a character has a pixel value which is very close to black), and the like. The engine 309 prints the process result (step 509), thus ending the processing.

In the above arrangement, the rendering result of the rendering engine is 8 bits/pixel for each of R, G, and B data. As for rendering engines that render in other color spaces, the same result can be obtained.

As described above, since each pixel can hold source object information even after rendering, post-processes such as more accurate edge extraction and the like can be achieved.

In the description of the above arrangement, the information of the source object is accurately recognized using the object information after rendering.

An example of an image processing apparatus which can hold object information upon object synthesis will be described below.

Since the apparatus arrangement is the same as that shown in FIG. 10, a detailed description thereof will be omitted.

Figure 14:
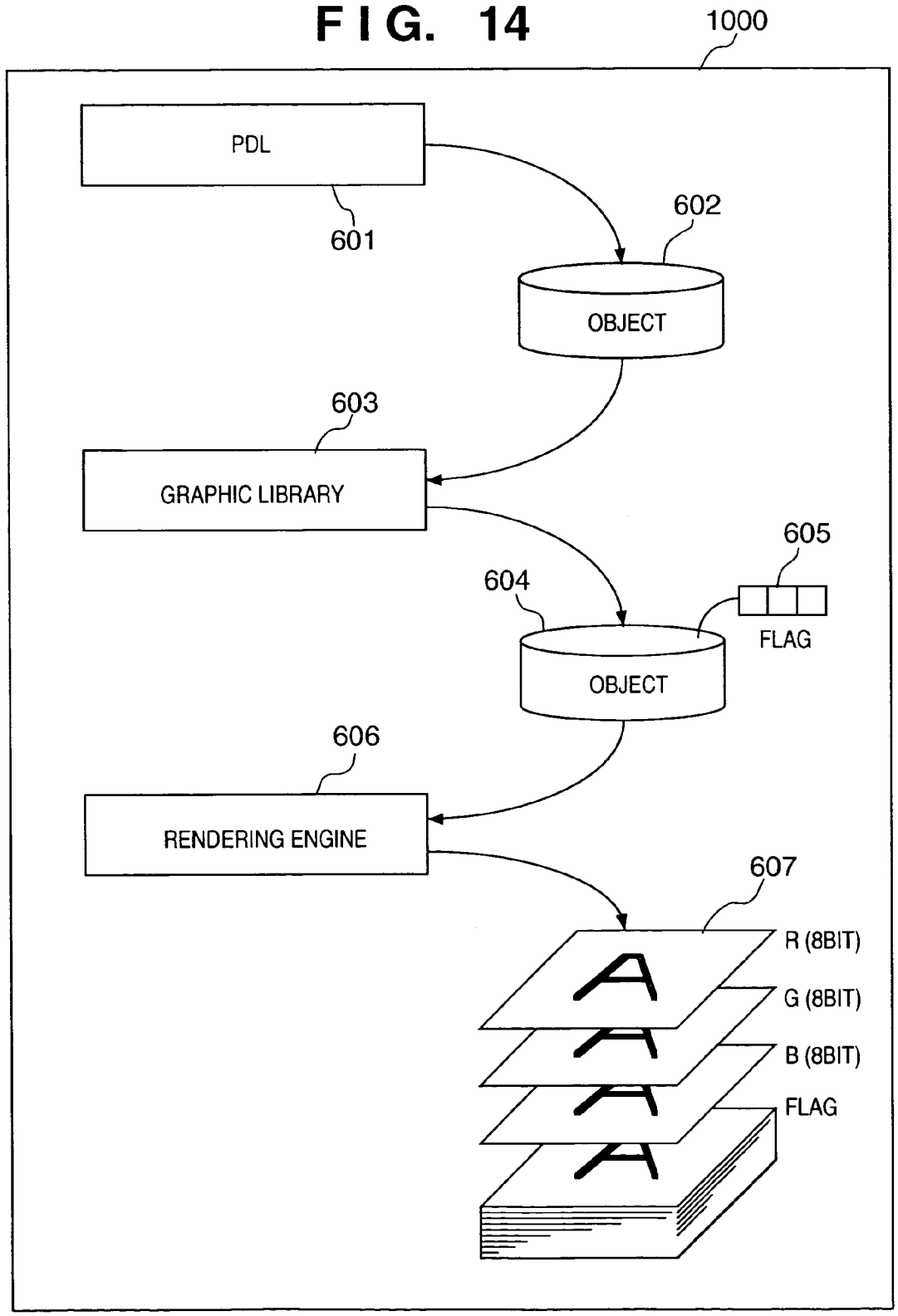
FIG. 14 is a block diagram showing the arrangement of the fourth embodiment.

Referring to FIG. 14, reference numeral 601 denotes a PDL interpreter for interpreting PDL data. Reference numeral 602 denotes an object created by the PDL interpreter. Reference numeral 603 denotes a graphic library which converts the object 602 into a command 604 that a rendering engine can interpret, and appending object information flags 605 to the command 604 (refer to FIG. 15 (to be described later) for details of object information). Reference numeral 606 denotes a rendering engine. Reference numeral 607 denotes a bitmap image of (8 bits for each of R, G, and B+object information bits (3 bits))/pixel.

FIG. 15 shows details of the object information 605. The object information uses 3 bits: bit 0 indicates if the pixel of interest belongs to a bitmap object or vector graphic (to be referred to as a bitmap flag hereinafter), bit 1 indicates if the pixel of interest belongs to a color object (to be referred to a color flag hereinafter), and bit 2 indicates if the pixel of interest belongs to an object other than a character or a character when the bitmap flag is "0" (=bitmap data), and indicates if a tone or resolution priority mode is selected when the bitmap flag is "1" (=vector data) (to be referred to as a character flag hereinafter).

FIG. 16 is a table showing the object synthesis method upon logic rendering.

When an object is S (only source, i.e., when an object is overwritten) or NotS (NOT of source=the source bit is 0/1-inverted and the object is overwritten), the information bits of the bitmap flag, color flag, and character flag of the object to be overwritten are left in the bitmap image 607. When an object is D (only destination, i.e., when a background is used) or NotD (NOT of destination=the destination bit is 0/1-inverted), the information bits of the bitmap flag, color flag, and character flag of the background are left. When SorD (OR of S and D), SandD (AND of S and D), SxorD (XOR of S and D), and SαD (α blend operation of S and D=AND, OR, or XOR of S and D with transparency) are made, 3 bits, i.e., the bitmap, color, and character flags of the object to be overwritten and those of the background shown in FIG. 15 are respectively ANDed to determine the information bits.

Figure 17:
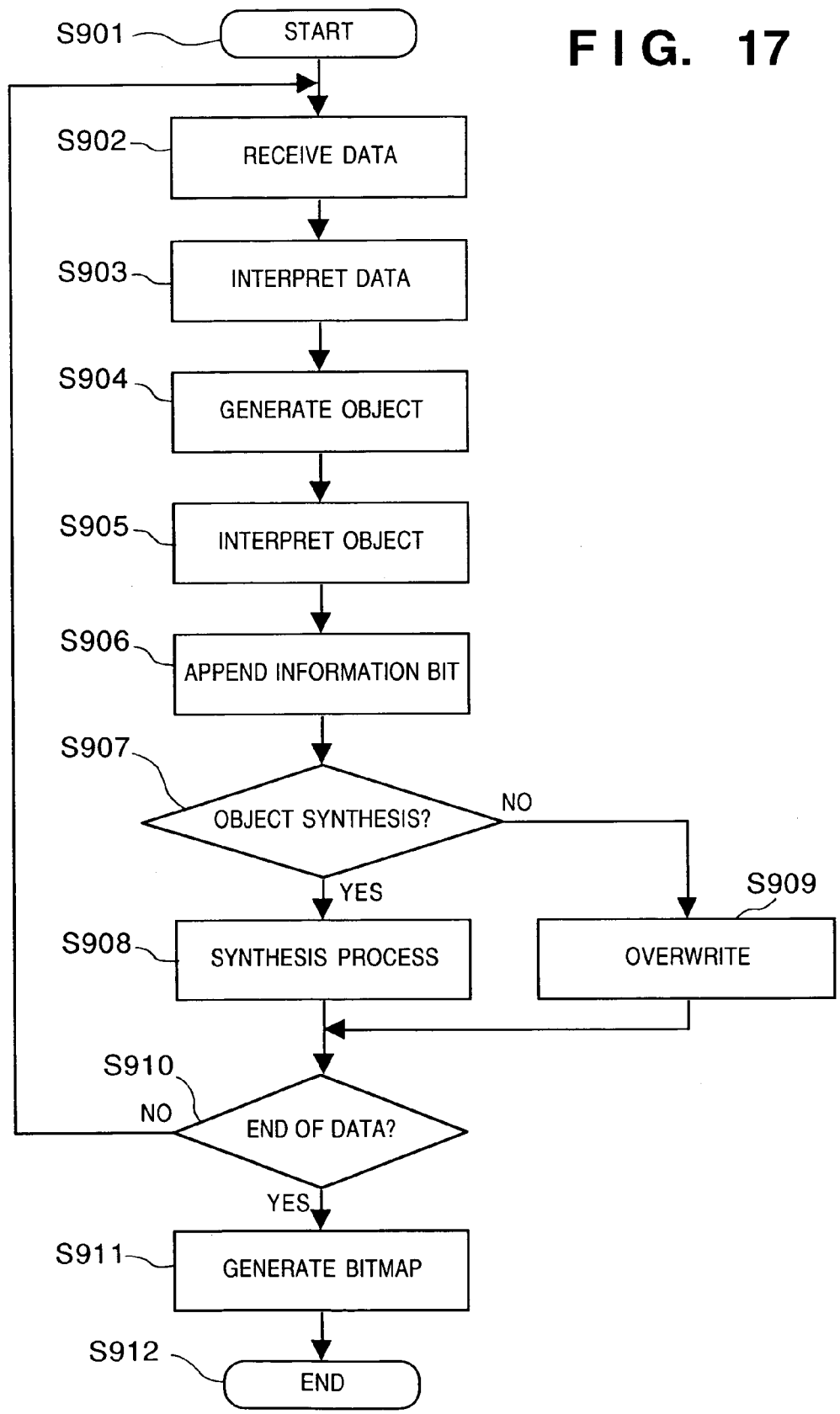
FIG. 17 is a flow chart showing the flow of the processing of the fourth embodiment.

The flow of the processing in this embodiment will be described below with reference to FIG. 17.

Upon receiving print data by the LBP 1000 (step 902), the PDL interpreter 601 interprets the received data (step 903). The PDL interpreter 601 outputs the interpretation result, i.e., the object 602 as one rendering command of one object in most cases (step 904). The graphic library 603 interprets the object 602 (step 905), and generates the command 604 appended with the object information flags 605 on the basis of the interpretation result (step 906). Upon receiving data of the command 604+flags 605, the rendering engine 606 checks if a synthesis process is required (step 907). If no object synthesis instruction is found, the engine 606 overwrites objects (step 909); if an object synthesis instruction is found, the engine 606 synthesizes objects on the basis of FIG. 16. Also, the engine 606 synthesizes the object information flags. The engine 606 then outputs 8 bits for each of synthesized (overwritten) R, G, and B data+flag synthesized information bits as a rendering result. Note that flags are in units of pixels (step 908). It is checked if all data to be rendered have been processed (step 910). If N in step 910, the processing restarts from step 902; otherwise, the bitmap data 607 are determined (step 911), thus ending the processing (step 912). Note that the determined bitmap data 607 is used in the process as in steps 508 and 509.

In the above description, upon making SorD, SandD, SxorD, or SαD, 3 bits, i.e., the bitmap, color, and character flags of S (object to be overwritten) and those of D (background) are respectively ANDed to determine information bits (3 bits) at the position where the object is overwritten on the background. Then, with reference to these information bits, the presence/absence of the binarization method, color conversion method, and black character process upon converting RGB 24 bits (8 bits for each of R, G, and B data) into CMYK 1 bit is determined.

However, some operators may not prefer a color print result of the processes which are done with reference to the aforementioned information bits obtained by ANDing.

To combat this problem, in the fifth embodiment, upon receiving a command input by the user from a host computer (not shown) connected to the LBP on the printer driver, ANDing of the information bits upon making SorD, SandD, SxorD, or SαD is inhibited, and the information flags are forcibly set to be all "0"s, as shown in FIG. 18. In this case, a portion that has undergone the synthesis process on a print does not undergo any process with reference to the information bits.

As a result, both the process using the information bits and the process without using any information bits can be selected for a portion that has undergone the synthesis process depending on operator's taste, and a print more suitable for the operator's taste can be obtained.

In the above synthesis process, object synthesis for synthesizing one object with the background by a two-term operation has been exemplified. Even when two, three, . . . objects are to be synthesized, i.e., three-term, four-term, . . . operations are made, they can be mathematically replaced by a set of two-term operations, and the above embodiment can be applied to such operations.

In the above description, if it is determined in step 910 that the data process is to proceed, the processing restarts from step 902 (=an example without any reception buffer). When the command 604 can store all print data, the processing can restart from step 907. When the object 602 can store all print data, the processing can restart from step 905.

The rendering result of the rendering engine is 8 bits/pixel for each of R, G, and B data. As for rendering engines that render in other color spaces, the same result can be obtained.

As described above, even for an object with transparency and an object that requires ROP, each pixel can hold source object information after rendering.

Since various image processes such as a black character process, binarization, filtering, and the like can be controlled on the basis of information of the types of objects, reproducibility of a character and the like can be improved.

Since object type flags can be inhibited from being synthesized as needed, data after rendering, that has undergone the synthesis process can be prevented from adaptively undergoing image processes.

Fifth Embodiment

Figure 19:
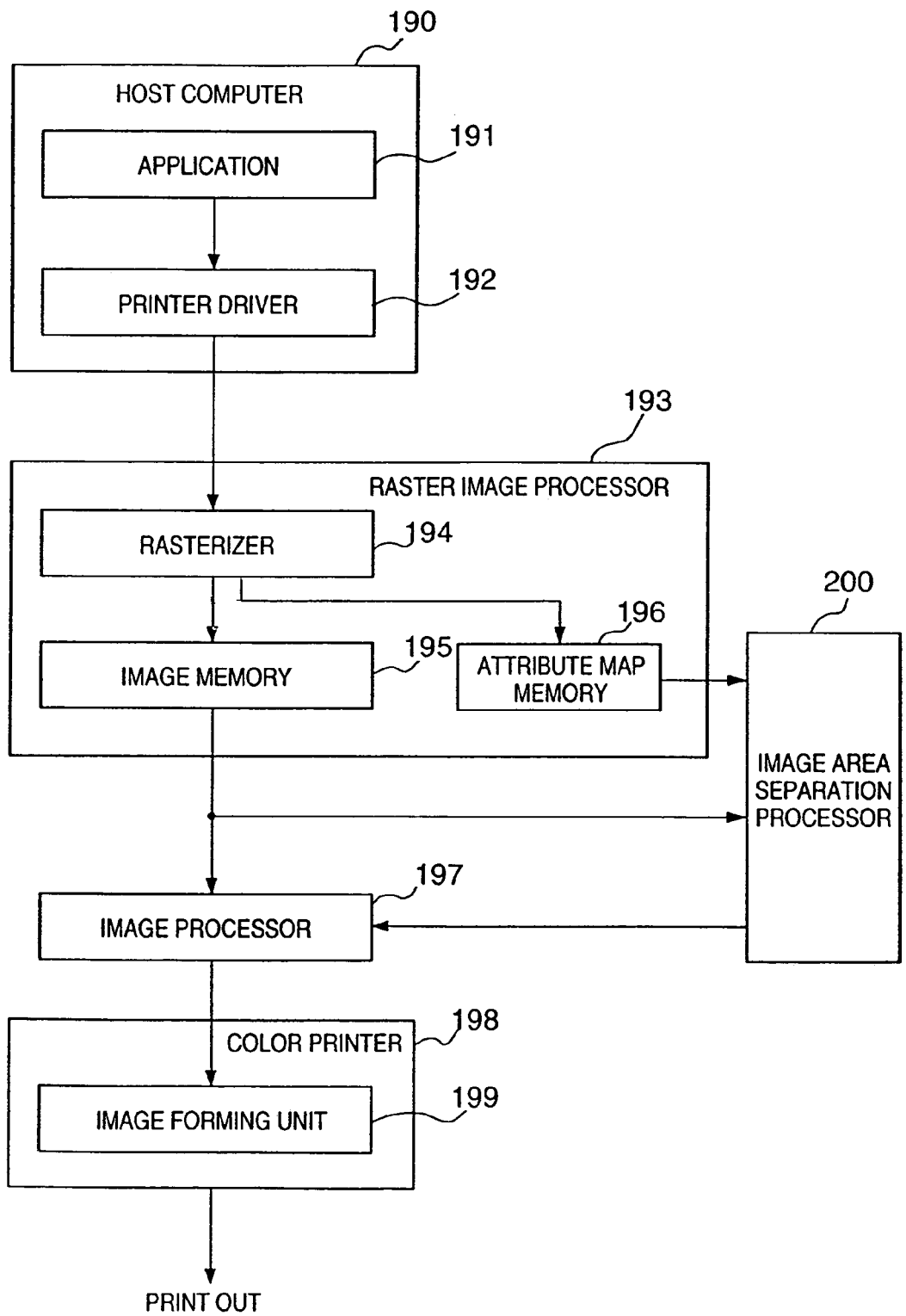
FIG. 19 is a block diagram showing the arrangement of an image processing system of the fifth embodiment.

FIG. 19 is a block diagram showing the arrangement of an image processing system of the fifth embodiment.

Reference numeral 190 denotes a host computer. Reference numeral 191 denotes an application such as a word-processor, draw software, graphic software, or the like used in the host computer 190. Reference numeral 192 denotes a printer driver for controlling an interface with a color printer 198 upon outputting a character, graphic data, or bitmap image from the application 191 to the color printer 198.

Reference numeral 193 denotes a raster image processor for rendering data output via the printer driver 192 to obtain image data. The raster image processor 193 includes a rasterizer 194, an image memory 195 for storing image data, and an attribute map memory 196.

Reference numeral 200 denotes an image area separation processor for identifying an image, and a character/line image in consideration of the edge amount of an image and continuity of the edge amount in a given area. The image area separation processor 200 is controlled to process only a given range of image data in which the image area separation process is effective, in accordance with an attribute map stored in the attribute map memory 196. Reference numeral 197 denotes an image processor for processing the image data stored in the image memory 195 to obtain an image with higher quality, and to obtain image data an image forming unit 199 (to be described below) can output. The image processor 197 switches its processes in accordance with a signal from the image area separation processor 200. Reference numeral 198 denotes a color printer which includes the image forming unit 199 for printing image data on a recording medium. The image forming unit 199 uses an electrophotographic or ink-jet recording scheme.

Note that details of the attribute map will be described later. The image forming unit 199 will be explained as that of the color printer 198, but this embodiment can be easily applied to even a monochrome printer.

For the sake of simplicity, the image memory 195 and attribute map memory 196 are depicted as independent blocks, but the image data and attribute map can be stored in a single storage medium so that they can be read out.

Digital document data created by the application 191 is expressed by a command system called PDL, as has been explained in the paragraphs of the prior art, and PDL is roughly composed of three objects. The first object is a character object, the second object is a graphic object such as vector data such as a figure, free curve, or the like, and the third object is a bitmap object such as image data obtained by scanning a photo, print, or the like via a scanner or the like.

For example, the character object consists of data such as a character code for identifying a character, a font that defines the shape of the character, size information indicating the character size, color information indicating the character color, and the like, and cannot be directly interpreted by the image forming unit 199. The printer driver 192 interfaces with the color printer 198, and sends a command sequence representing objects such as character, graphic, bitmap, and the like to the rasterizer 194 while attaining, e.g., synchronization so that the image forming unit 199 as the final stage can appropriately output an image. The rasterizer 194 converts the received command sequence into two-dimensional bitmap image data the image forming unit 199 can appropriately interpret, and outputs the attribute map at the same time.

The attribute map is two-dimensional information which has attribute information of each pixel of an object in units of pixels, as has also been described in the first embodiment, and is stored in the attribute map memory 196 so that the two-dimensional image data can correspond to the attribute map in units of pixels.

An example of the format of the attribute map of this embodiment will be described below with reference to FIG. 20.

FIG. 20 shows an example of the format of the attribute map.

The attribute map of this embodiment has 1-bit information consisting of only the 0-th bit, which is a bitmap flag. If this flag is "1", it indicates a pixel generated from a bitmap object; if the flag is "0", it indicates a pixel generated from a vector object, i.e., a character or graphic image. The rasterizer 194 finally checks in units of pixels if the pixel of interest is generated from a character, graphic, or natural image object, and stores that checking result in the attribute map in correspondence with two-dimensional image data.

FIG. 21 shows an example of the attribute map stored in correspondence with image data in units of pixels.

FIG. 21 depicts an image obtained by superposing a numeral "1" as a character object on a bitmap object. Upon converting into a two-dimensional bitmap, "1" for a pixel generated from a vector object (character or graphic object), or "0" for a pixel generated from a bitmap object is output in units of pixels according to the format of the attribute map, thus generating the attribute map shown in FIG. 21. Note that the attribute map information is inverted to that in FIG. 20. Depending on the format used, "1" may be set for a bitmap object and "0" for a vector (character or graphic) object, as shown in FIG. 20, or "0" for a bitmap object and "1" for a vector (character or graphic) object, as shown in FIG. 21.

Figure 22:
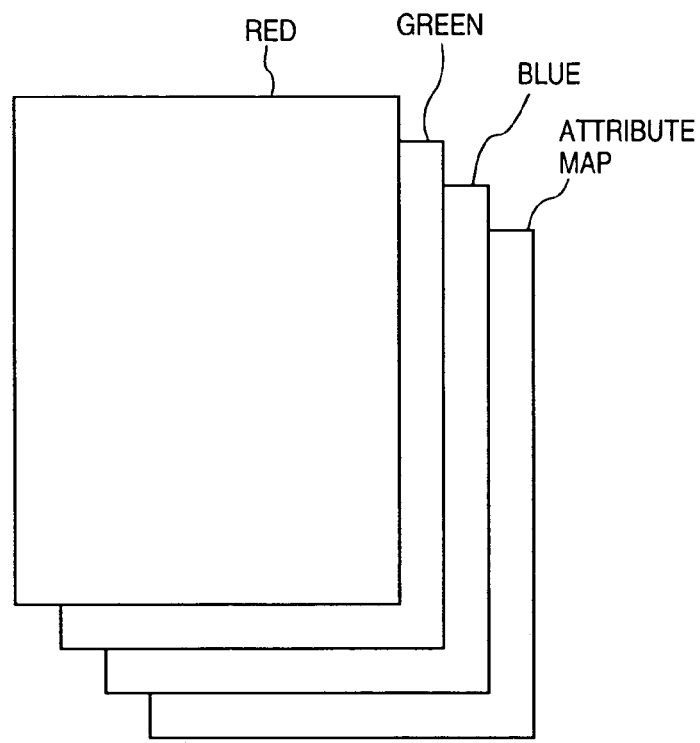
FIG. 22 shows an example of the configuration of an attribute map of the fifth embodiment.
Figure 23:
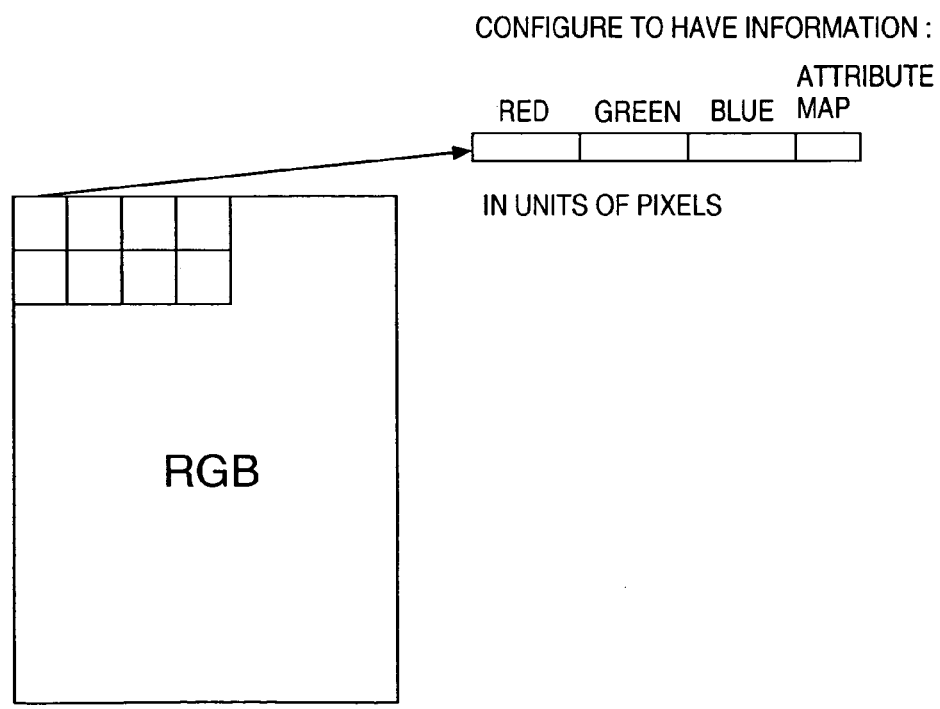
FIG. 23 shows an example of the configuration of an attribute map of the fifth embodiment.
Figure 24:
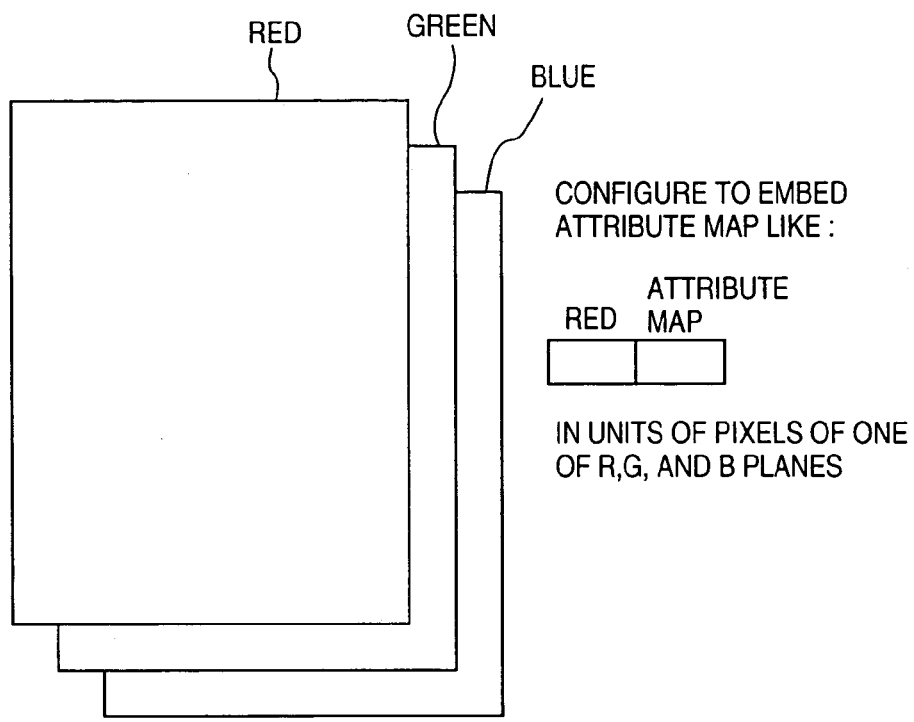
FIG. 24 shows an example of the configuration of an attribute map of the fifth embodiment.
Figure 25:
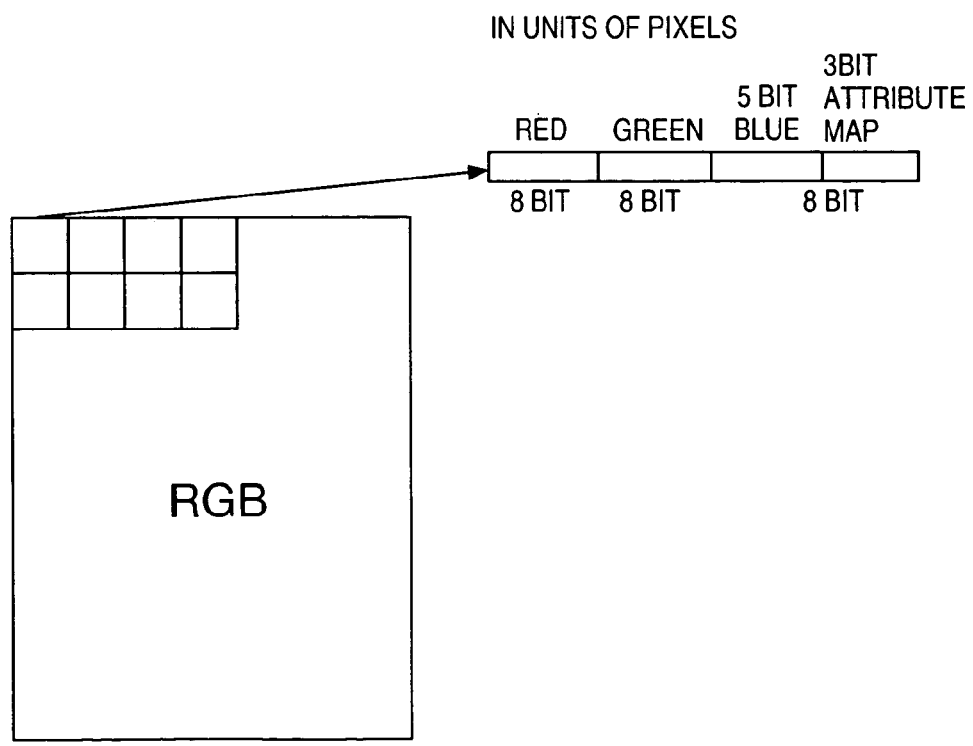
FIG. 25 shows an example of the configuration of an attribute map of the fifth embodiment.

The format of the attribute map is not particularly limited as long as attributes can be stored in correspondence with each other in units of pixels. For example, image data may be stored in the image memory 195 using the attribute map shown in FIG. 21 as a plane, and the attribute map may be stored in the attribute map memory 196. When these data are stored in a single storage medium, the plane of the attribute map may be added to R, G, and B planes, as shown in FIG. 22. On the other hand, when R, G, and B data are formed in units of pixels, as shown in FIG. 23, the attribute map may be embedded in the form of information appended to the RGB information of each pixel. In order to prevent the data size from increasing, the attribute map may be embedded in lower bits of each pixel of one or a plurality of R, G, and B planes, as shown in FIG. 24. Alternatively, upon forming R, G, and B data in units of pixels, the attribute map may be embedded in lower bits of one or a plurality of RED, GREEN, and BLUE color information bits (8 bits each), as shown in FIG. 25. In the example shown in FIG. 25, the attribute map is embedded in lower 3 bits of 8-bit BLUE information.

Figure 2A:
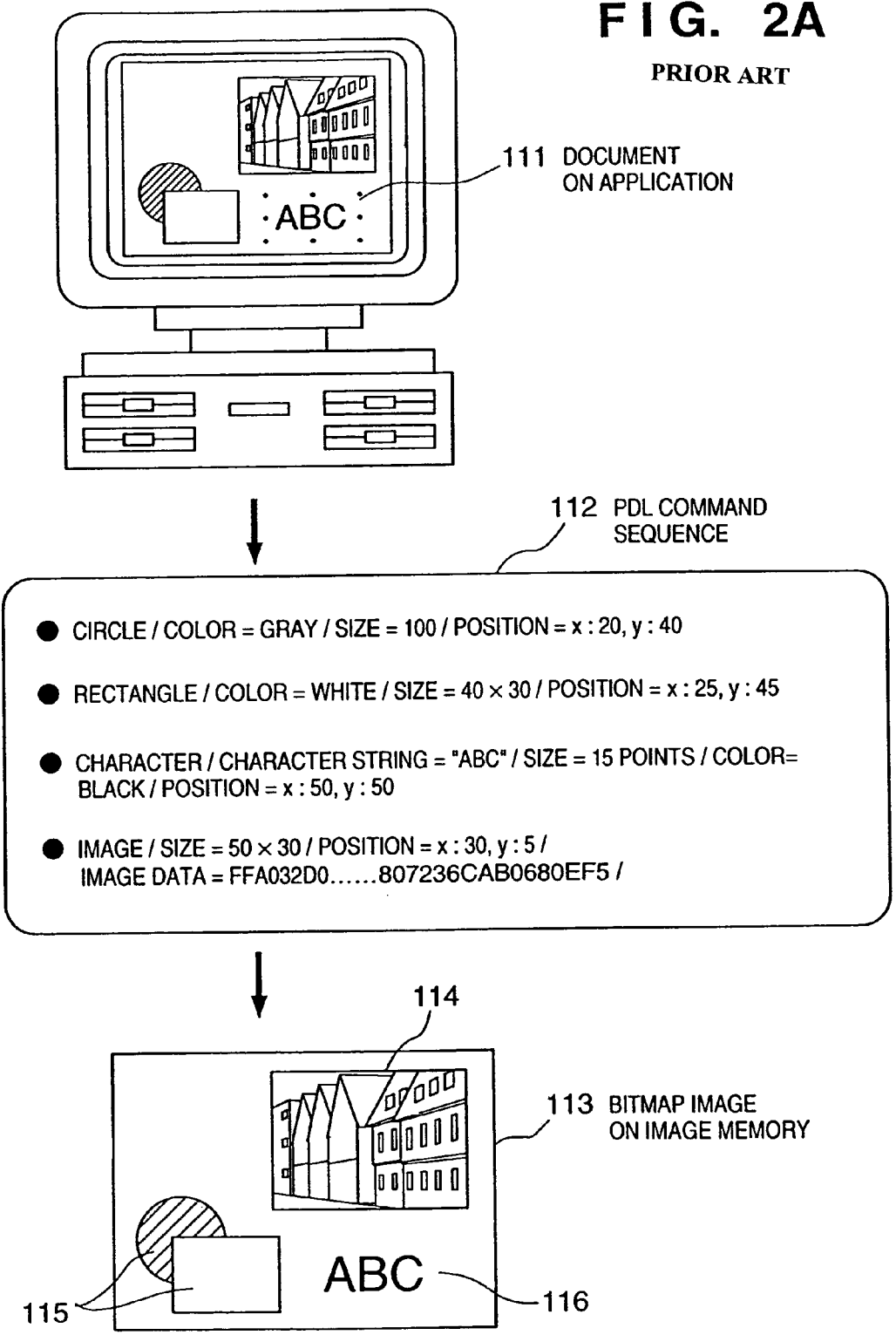
FIGS. 2A and 2B are views for explaining an image output sequence using PDL (page description language)
Figure 2B:
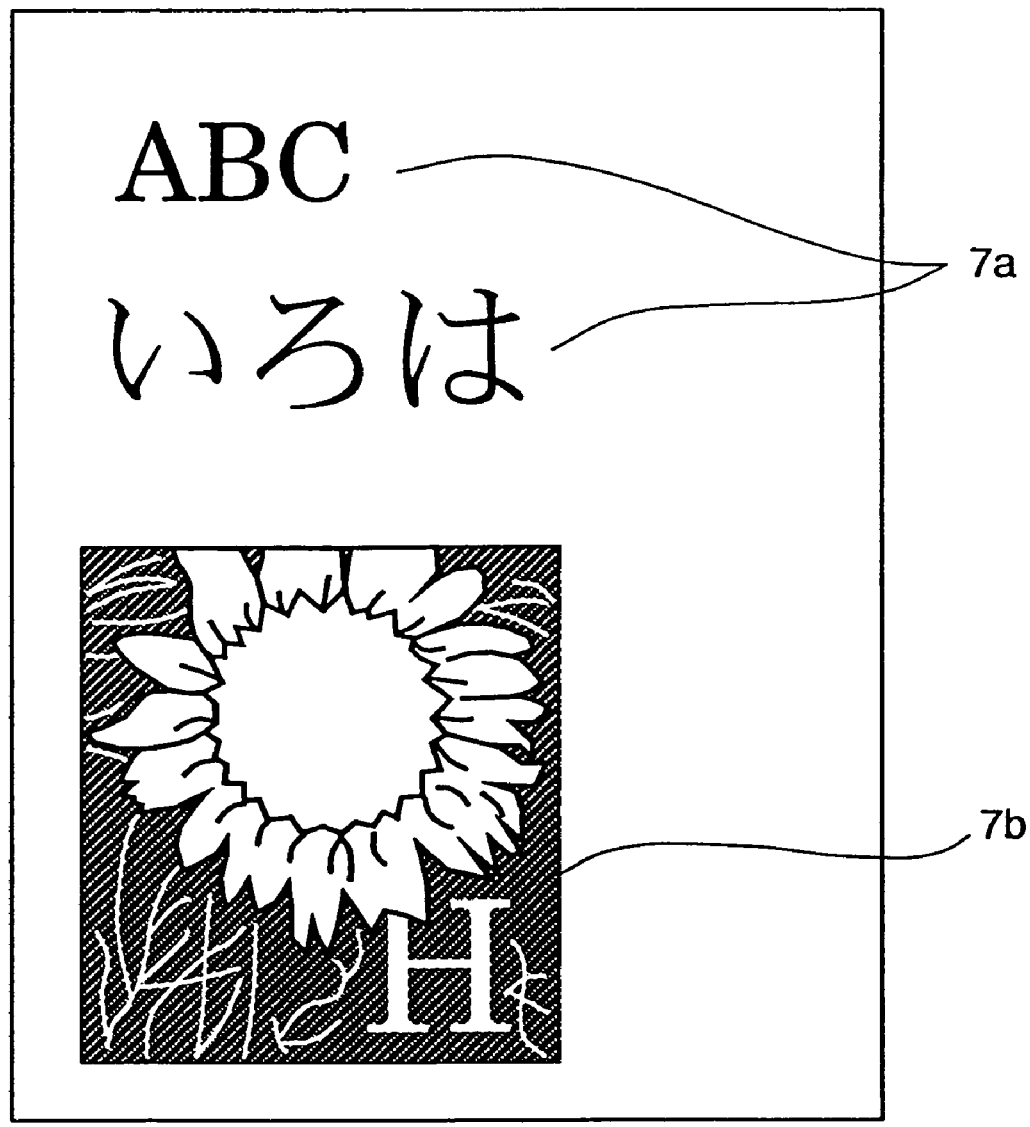

For example, when the attribute map is used, the following process can be done. With reference to the example shown in FIG. 2A, these images have different attributes: an image 114 is a natural image scanned by a scanner or the like, images 115 are graphic images such as a circle, rectangle, and the like, which are generated electronically, and an image 116 is a character (TEXT) image. Note that the image forming unit 199 may reproduce only binary dots. In such case, the rasterizer 194 renders Y, M, C, and K multi-value bitmap images on the image memory 195. Upon receiving these bitmap images, the image forming unit 199 converts the multi-valued image signals into binary image signals by a known binarization process such as error diffusion, dithering, or the like and then prints them out. At this time, an optimal binarization method varies depending on image attributes. That is, graphic data such as characters, figures, and the like preferably undergo binarization that uses a small matrix size of dithering and attaches importance on resolution. On the other hand, a natural image such as a photo or the like preferably undergoes binarization that uses a large matrix size, and attaches importance on tone reproduction.

In view of the foregoing, when the aforementioned attribute map shown in FIG. 20 is used, the character image 116 and graphic images 115 have the 0th bit="0" of the attribute map, and the natural (bitmap) image 114 has the 0th bit="1" of the attribute map. For this reason, a natural image, character image, and graphic image can be easily segmented in units of pixels. Note that a bitmap object which is assigned as a natural image to the attribute map may include a character image which is scanned from an original using a scanning device such as an image scanner or the like and is present on the original in addition to a so-called natural image such as a photo, printed matter, or the like. In this case, according to the attribute map described so far, information is stored as a natural image, and that image undergoes a binarization process that attaches importance on tone reproduction. As a result, the character image present on the bitmap object is converted into a low-resolution image, which is not easy to read.

To prevent such problem, in this embodiment, the image area separation processor 200 detects a character image area present on the bitmap object. The image area separation processor 200 is a means for determining a character portion or a portion other than the character portion in units of pixels or blocks. The image area separation processor 200 cannot always perfectly determine characters on an original. When an object such as a character object requires no image area separation process, such object does not preferably undergo the process, since a portion that is not recognized as a character may be erroneously determined. In general, since the image area separation process requires a large computation amount, it is important to limit the range for the purpose of a short processing time. Especially, when image area separation is done by software (e.g., the CPU processes an image area separation program) in place of any hardware, the load on resources such as the CPU and the like can also be reduced. For this reason, in this embodiment, the image data range that undergoes the image area separation process by the image area separation processor 200 is limited in accordance with the attribute map.

An example of the image area separation process executed by the image area separation processor 200 will be described below with reference to FIG. 26.

Figure 26:
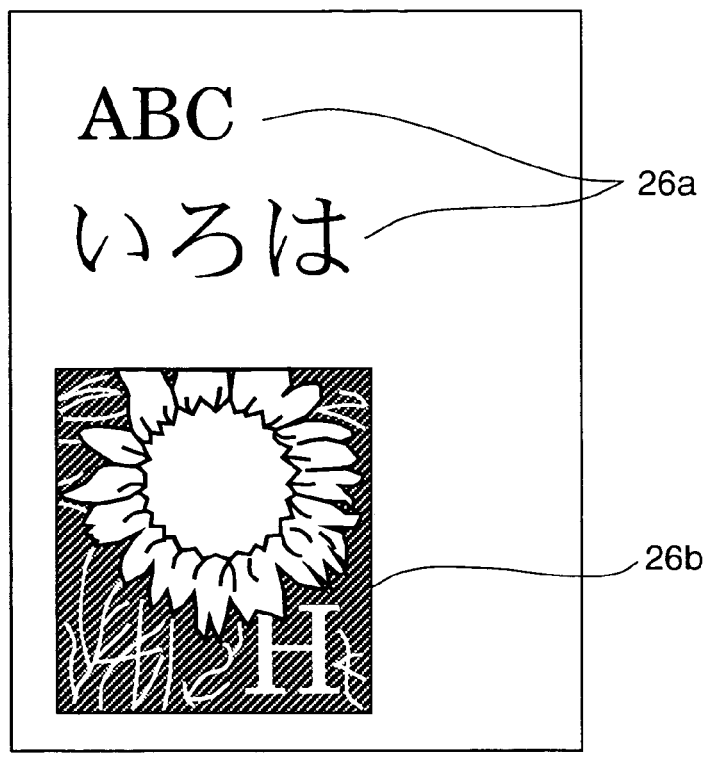
FIG. 26 shows an image obtained after image data is rendered into a bitmap image.

FIG. 26 shows an image after image data is rendered to a bitmap image.

Figure 27:
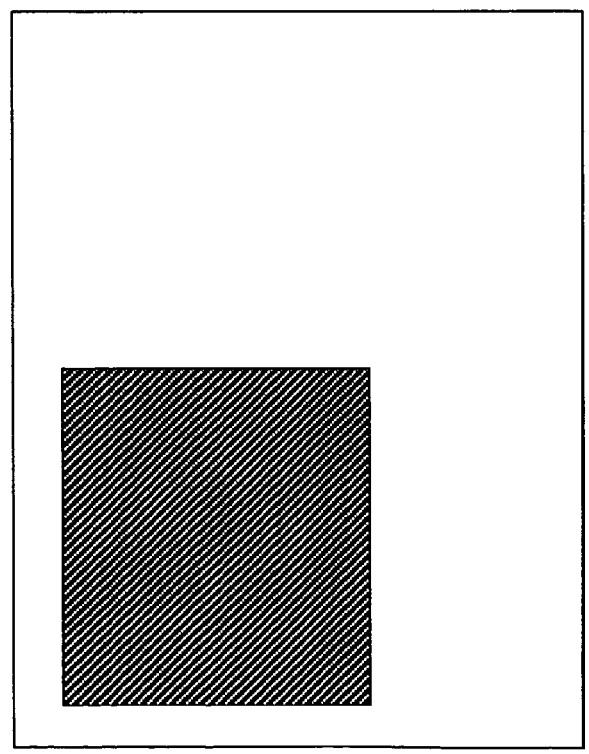
FIG. 27 shows an attribute map generated from the image shown in FIG. 26.

Reference numeral 26a denotes the vector objects of characters "ABC" and "いろは"; and 26b, a bitmap object. FIG. 27 shows the attribute map generated from the image shown in FIG. 26. A rectangle painted in black corresponds to "1"s set in the attribute map, and is generated from the bitmap object 26b. Although an alphabet "H" is drawn in the bitmap object 26b, since that character is drawn in an image, it is also expressed as a bitmap object on the attribute map. The image area separation processor 200 executes an image area separation process for only the range with the bitmap object attribute on the attribute map corresponding to the image shown in FIG. 26 so as to prevent the vector objects 26a from being erroneously determined as bitmap objects and to reduce the computation volume.

Figures 28, 29:
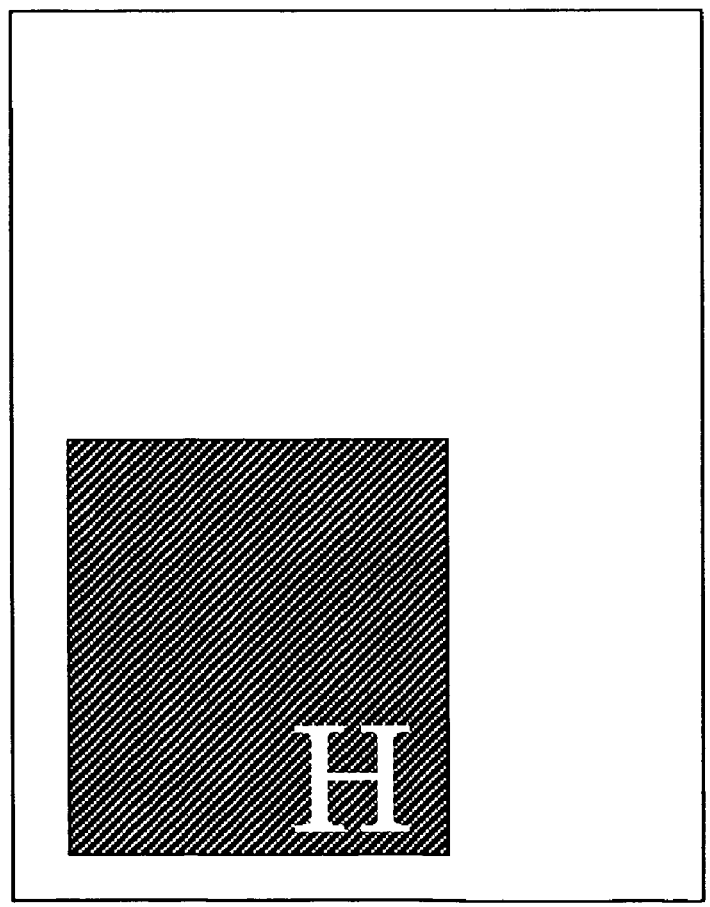
FIG. 28 shows an example of a dither matrix of the fifth embodiment.
FIG. 29 is a view for explaining the range to undergo an image area separation process of the fifth embodiment.

Subsequently, a dither matrix shown in, e.g., FIG. 28 is used for a range other than the range that undergoes the image area separation process and pixels or blocks which are determined to be characters in the image area separation process. FIG. 29 shows this range. A blank portion corresponds to the range for which the dither matrix shown in FIG. 28 is used. As can be seen from a comparison with FIG. 27, the character "H" portion in the bitmap object is added. On the other hand, a dither matrix shown in FIG. 30 is used for pixels which are determined to be a natural image in the image area separation process. Such pixels correspond to a black portion in FIG. 29.

Assuming that multi-valued data used is 8-bit data and ranges from 0 to 255 levels, when the value of multi-valued data of each pixel is larger than a threshold value of each cell in the dither matrix shown in FIG. 28 or 30, that dot is turned on; otherwise, the dot is turned off. FIG. 28 shows the dither matrix having a 3×3 size, which can reproduce an image at a resolution of 200 dpi and has 10 gray levels, if one pixel is 600 dpi. Hence, although the number of gray levels is small, an image can be reproduced at high resolution. On the other hand, FIG. 30 shows the dither matrix having an 8×8 size, which can express 65 gray levels at 75 dpi, if one pixel is 600 dpi. Although the resolution is low, the number of gray levels is large, and a natural image can be reproduced with higher quality than the dither matrix shown in FIG. 28. With this arrangement, a character in a bitmap object can be output at a high resolution, and other bitmap object portions can be output using a larger number of gray levels while eliminating determination errors of the image area separation process and reducing the computation volume.

The processing flow of the processing executed in the fifth embodiment will be described below using FIG. 31.

Figure 31:
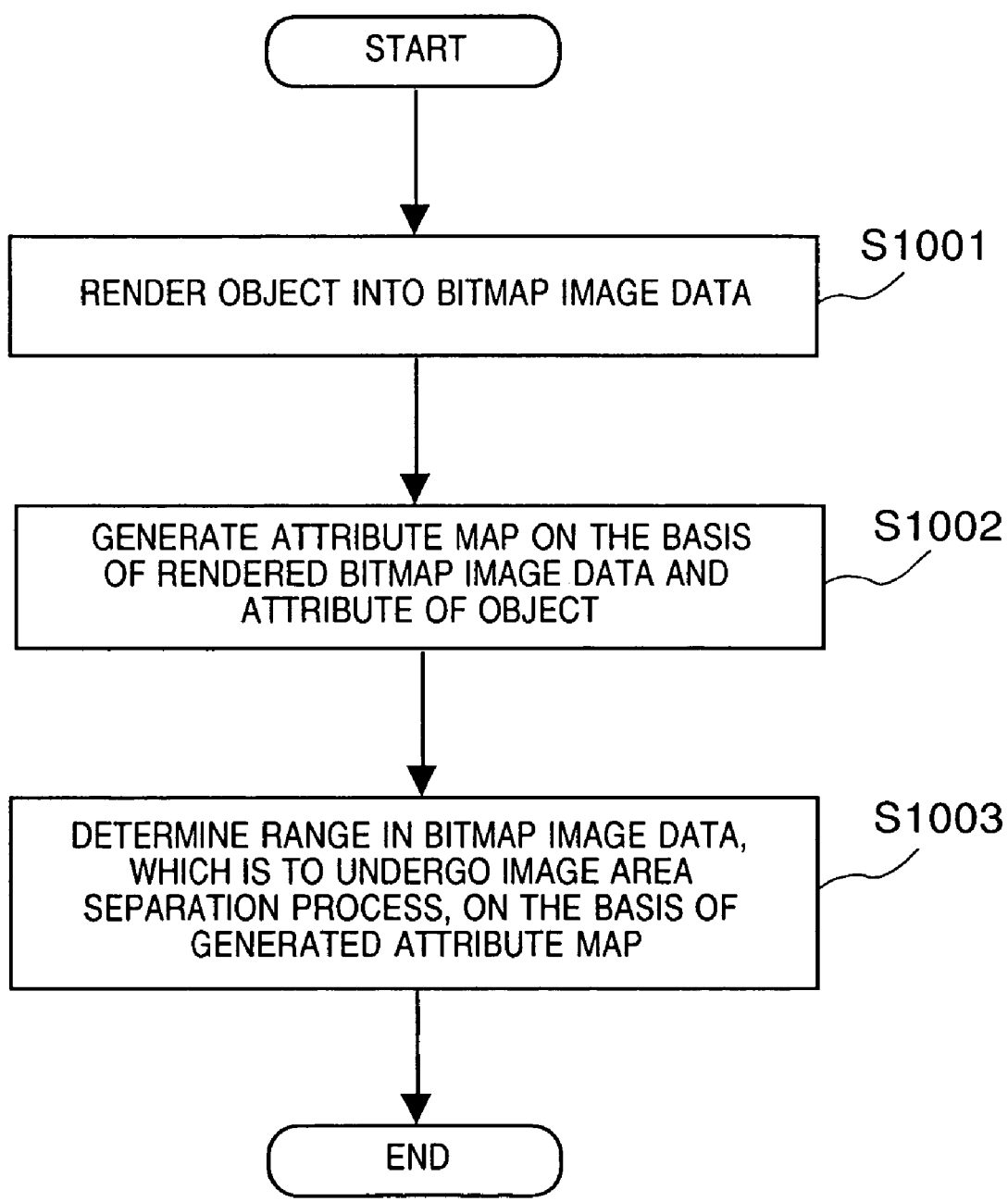
FIG. 31 is a flow chart showing the processing flow executed in the fifth embodiment.

FIG. 31 is a flow chart showing the processing flow executed in the fifth embodiment.

In step S1001, a plurality of objects that form input image data are rendered to bitmap image data by the rasterizer 194. The rendered bitmap image data is stored in the image memory 195. In step S1002, the attribute map of the bitmap image data is generated on the basis of the rendered bitmap image data and attributes of the objects. The generated attribute map is stored in the attribute map memory 196. In step S1003, the range in the bitmap image data, which is to undergo the image area separation process, is determined on the basis of the generated attribute map, and the image area separation processor 200 executes that process for the determined range. Then, the image forming unit 199 forms an image obtained after the image processes of the image processor 197 for the bitmap image data that has undergone the image area separation process and the remaining bitmap image data.

As described above, the range in the bitmap image data to be output, to which the image area separation process is effectively applied, is specified using the attribute map, and only the specified range undergoes the image area separation process. In this manner, determination errors of pixels that belong to a character can be eliminated, and the computation volume of the image area separation process itself can be reduced. Also, by configuring the image area separation process result to designate the attribute map more finely, an image more suitable for the operator can be reproduced.

Sixth Embodiment

Figure 32:
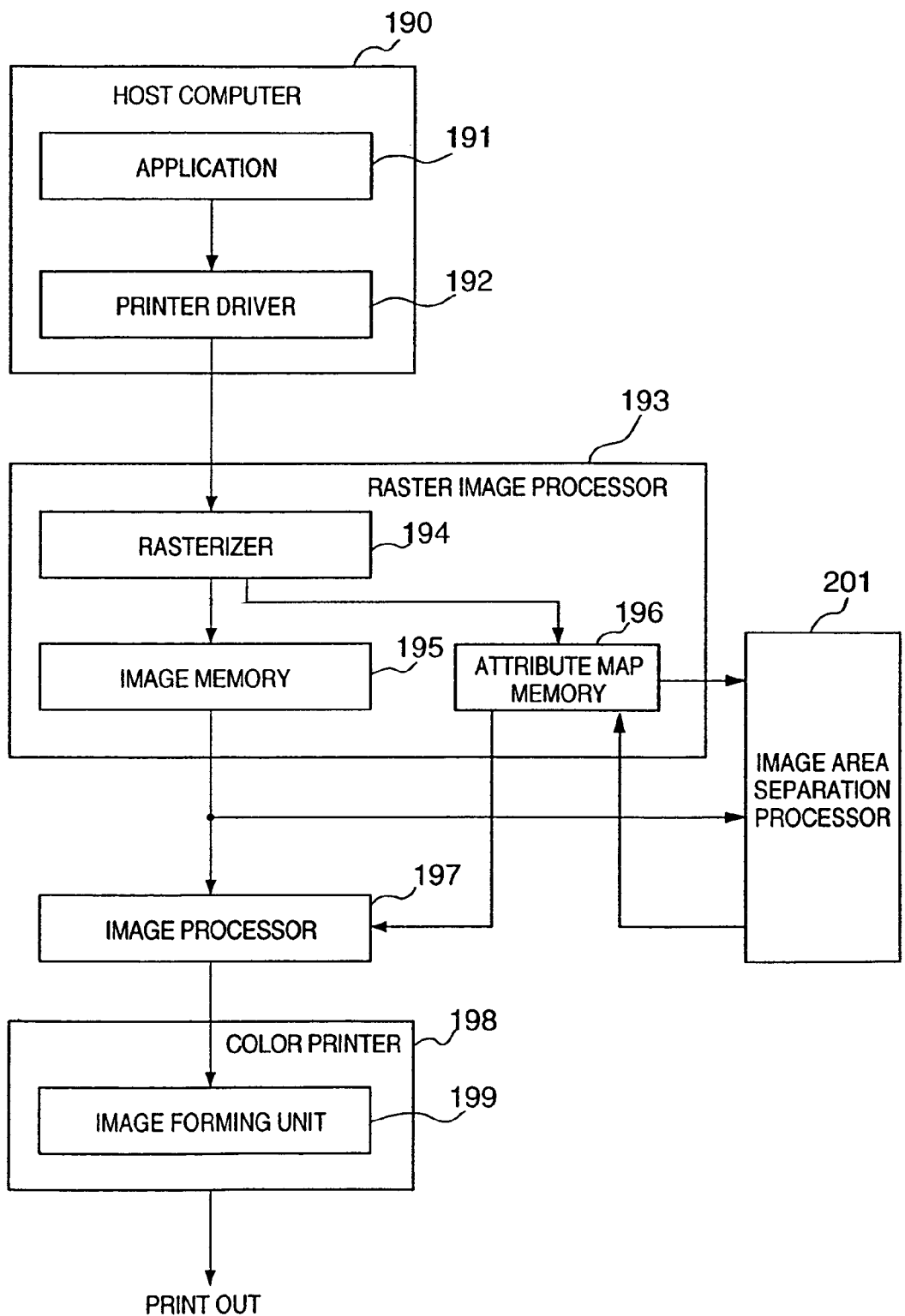
FIG. 32 is a block diagram showing the arrangement of an image processing system of the sixth embodiment.

In the sixth embodiment, as shown in FIG. 32, a character image area detected by an image area separation processor 201 is fed back to update the attribute map in the attribute map memory 196 in the image processing system of the fifth embodiment shown in FIG. 19.

With this arrangement, after the attribute map is generated upon rendering input image data into bitmap data by the rasterizer 194, more than one attribute maps are generated or updated in accordance with the image area separation process result, thus building a system that can realize higher image quality.

The image processor 197 processes individual pixels in image data with reference to the attribute map. That is, the image processor 197 switches a dither matrix used for each pixel in accordance with the attribute map. In this manner, character and graphic images can be reproduced at high resolution while maintaining the tone reproduction characteristics of a natural image in the image data, thus providing a high-quality image.

Even when a natural image includes a character, since the attribute map is updated by the image area separation processor 201, as described above, that character can be expressed at high resolution, and a higher-quality image can be reproduced.

Since the attribute map is updated, other image processes and finer attributes can be defined, and more flexible control and higher image quality can be attained.

Note that the arrangement of each of the above embodiments may be applied to either a system constituted by a plurality of devices (e.g., a host computer, an interface device, a reader, a printer, and the like), or an apparatus consisting of a single equipment (e.g., a copying machine, a facsimile apparatus, or the like).

The above embodiments are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   discrimination means for discriminating a type of a plurality of objects in an image to be rendered;
   determination means for determining whether or not the discriminated object is in condition to be synthesized with other objects;
   first synthesis means for synthesizing the objects in accordance with the determination result;
   second synthesis means for synthesizing object type information of objects discriminated by said discrimination means; and
   processing means for appending the object type information synthesized by said second synthesis means to a rendering result obtained by rendering the object to be rendered in units of pixels,
   wherein the syntheses of the first and second synthesis means are inhibited upon receiving an inhibition command of the synthesis process.

2. The apparatus according to claim 1, wherein the type of object to be rendered includes information indicating if an object is a bitmap or a vector graphic.

3. The apparatus according to claim 1, wherein the type of object to be rendered includes information indicating if an object is a color or monochrome object.

4. The apparatus according to claim 1, wherein the type of object to be rendered includes information indicating if an object is a character or an object other than the character.

5. The apparatus according to claim 1, wherein the type of object to be rendered includes information indicating if an object is a tone or resolution priority object.

6. The apparatus according to claim 1, further comprising image processing means for performing an image process on data of the rendering result in accordance with the information of the type of object.

7. The apparatus according to claim 6, wherein the image process includes a binarization process, filter process, and black character extraction process.

8. The apparatus according to claim 7, wherein the image process outputs rendered data using black alone when it is determined in accordance with information of the object that the object is a black character.

9. The apparatus according to claim 1, wherein said second synthesis means synthesizes the object type information of the objects in accordance with one of synthesis modes including OR, AND, XOR and $\alpha$ blend.

10. The apparatus according to claim 1, wherein the inhibition command is input by a printer driver of a host computer connected to said image processing apparatus.

11. The apparatus according to claim 1, wherein the synthesis by said first synthesis means is done for at least two different objects.

12. An image processing method comprising:
    a discrimination step of discriminating a type of a plurality of objects in an image to be rendered;
    a determination step of determining whether or not the discriminated object is in condition to be synthesized with other objects;
    a first synthesis step of synthesizing the objects in accordance with the determination result;
    a second synthesis step of synthesizing object type information of objects discriminated by the discrimination step; and
    a processing step of appending the object type information synthesized by the second synthesis step to a rendering result obtained by rendering the object to be rendered in units of pixels,
    wherein the syntheses of the first and second synthesis steps are inhibited upon receiving an inhibition command of the synthesis process.

13. A computer-readable storage medium on which is stored a computer-readable program comprising codes which are loaded and executed by a computer to make the computer function as an image processing apparatus, said program codes comprising codes to perform the steps of:
    a discrimination step of discriminating a type of a plurality of objects in an image to be rendered;
    a determination step of determining whether or not the discriminated object is in condition to be synthesized with other objects;
    a first synthesis step of synthesizing the objects in accordance with the determination result;
    a second synthesis step of synthesizing object type information of objects discriminated by the discrimination step; and
    a processing step of appending the object type information synthesized by the second synthesis step to a rendering result obtained by rendering the object to be rendered in units of pixels,
    wherein the syntheses of the first and second synthesis steps are inhibited upon receiving an inhibition command of the synthesis process.

* * * * *